(12) United States Patent
Markham et al.

(10) Patent No.: US 11,761,810 B2
(45) Date of Patent: Sep. 19, 2023

(54) TANK MAINTENANCE ACCESS CHAMBER

(71) Applicant: FRANKLIN FUELING SYSTEMS, LLC, Madison, WI (US)

(72) Inventors: Lee B. Markham, Woodbridge (GB); John R. West, Ipswich (GB); William S. Nelson, Sun Prairie, WI (US); Paul Ridge, Sudbury (GB)

(73) Assignee: FRANKLIN FUELING SYSTEMS, LLC, Madison, WI (US)

( * ) Notice: Subject to any disclaimer, the term of this patent is extended or adjusted under 35 U.S.C. 154(b) by 0 days.

(21) Appl. No.: 17/669,569

(22) Filed: Feb. 11, 2022

(65) Prior Publication Data

US 2022/0163369 A1 May 26, 2022

Related U.S. Application Data

(62) Division of application No. 15/756,536, filed as application No. PCT/US2016/041658 on Jul. 8, 2016, now Pat. No. 11,248,945.

(Continued)

(51) Int. Cl.
*G01F 23/00* (2022.01)
*G01F 23/80* (2022.01)
(Continued)

(52) U.S. Cl.
CPC .......... *G01F 23/808* (2022.01); *F04B 49/04* (2013.01); *F04B 49/065* (2013.01); *F04B 51/00* (2013.01);
(Continued)

(58) Field of Classification Search
CPC . F16C 1/10; G01F 23/68; G01F 23/70; G01F 23/74
See application file for complete search history.

(56) References Cited

U.S. PATENT DOCUMENTS

| 1,025,237 A | 5/1912 | Benjamin |
| 2,875,324 A | 2/1959 | Camp et al. |

(Continued)

FOREIGN PATENT DOCUMENTS

| CN | 101592514 A | 12/2009 |
| CN | 204002755 U | 12/2014 |

(Continued)

OTHER PUBLICATIONS

International Preliminary Report on Patentability received for PCT Patent Application No. PCT/US2016/041658, dated Mar. 15, 2018, 15 pages.

(Continued)

*Primary Examiner* — Jamel E Williams
(74) *Attorney, Agent, or Firm* — Faegre Drinker Biddle & Reath LLP

(57) ABSTRACT

A fuel storage system has a tank access chamber with improved monitoring, servicing and maintenance capabilities. In particular, the chamber includes a sump monitored by a liquid sensor whose proper function can be automatically checked remotely, e.g., via an electronic controller or remote manual operation. In cases where such a check indicates a need for physical inspection of the sump sensor, the present system provides for sensor removal and installation by service personnel from a location outside the tank access chamber. Thus, the present system facilitates regular inspection and routine or unplanned maintenance without the need for a person to physically enter the tank access chamber.

15 Claims, 14 Drawing Sheets

Related U.S. Application Data

(60) Provisional application No. 62/212,943, filed on Sep. 1, 2015.

(51) Int. Cl.

| | |
|---|---|
| *G01M 3/32* | (2006.01) |
| *F04B 51/00* | (2006.01) |
| *F04B 49/04* | (2006.01) |
| *F04B 49/06* | (2006.01) |
| *G01F 23/68* | (2006.01) |
| *G01F 23/70* | (2006.01) |
| *G01F 25/20* | (2022.01) |
| *F16C 1/10* | (2006.01) |
| *F16H 21/44* | (2006.01) |
| *F16H 25/18* | (2006.01) |
| *G01F 23/74* | (2006.01) |

(52) U.S. Cl.
CPC ............... *F16C 1/10* (2013.01); *F16H 21/44* (2013.01); *F16H 25/18* (2013.01); *G01F 23/68* (2013.01); *G01F 23/70* (2013.01); *G01F 23/74* (2013.01); *G01F 25/22* (2022.01); *G01M 3/3245* (2013.01)

(56) References Cited

U.S. PATENT DOCUMENTS

| | | | |
|---|---|---|---|
| 3,941,507 A | 3/1976 | Niedermeyer | |
| 4,025,237 A | 5/1977 | French | |
| 4,067,663 A | 1/1978 | Brooks et al. | |
| 4,821,022 A | 4/1989 | Jannotta | |
| 4,989,560 A | 2/1991 | Rasdal et al. | |
| 5,100,024 A | 3/1992 | Bravo | |
| 5,150,614 A * | 9/1992 | Urich | G01F 25/20 |
| | | | 335/219 |
| 6,006,773 A | 12/1999 | Bravo | |
| 9,068,696 B2 | 6/2015 | Lapoint | |
| 9,200,630 B1 * | 12/2015 | Huff | F04D 15/0218 |
| 2001/0009115 A1 | 7/2001 | Ficyk et al. | |
| 2003/0047211 A1 | 3/2003 | Bravo et al. | |
| 2011/0089071 A1 | 4/2011 | Kuehn | |
| 2013/0008247 A1* | 1/2013 | Bardsley | G01F 23/62 |
| | | | 73/306 |
| 2014/0130874 A1 | 5/2014 | Burlage et al. | |
| 2015/0143895 A1 | 5/2015 | Cummings | |
| 2016/0319816 A1 | 11/2016 | Brostrom et al. | |
| 2017/0058886 A1 | 3/2017 | Cummings | |
| 2019/0056256 A1 | 2/2019 | Markham et al. | |

FOREIGN PATENT DOCUMENTS

| | | | |
|---|---|---|---|
| EP | 2532550 A2 | 12/2012 | |
| GB | 1517280 A | 7/1978 | |

OTHER PUBLICATIONS

International Search Report and Written Opinion received for PCT Patent Application No. PCT/US2016/041658, dated Oct. 4, 2016, 15 pages.

Search Report dated Apr. 5, 2019 issued in corresponding European Patent Application No. 16842485.1, 11 pages.

* cited by examiner

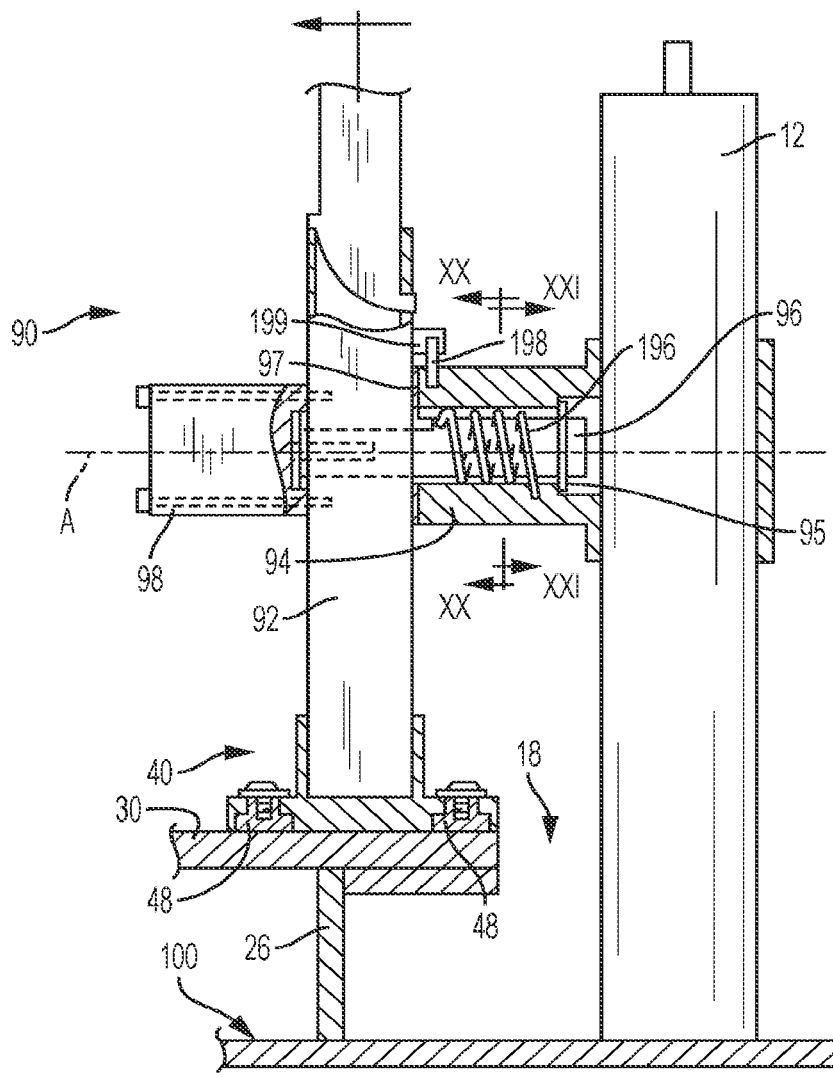
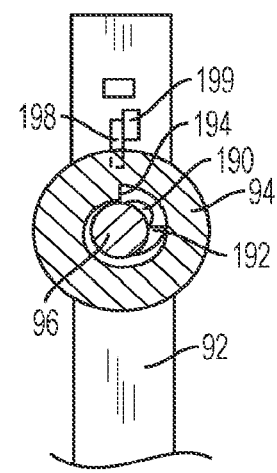
FIG. 19
FIG. 20

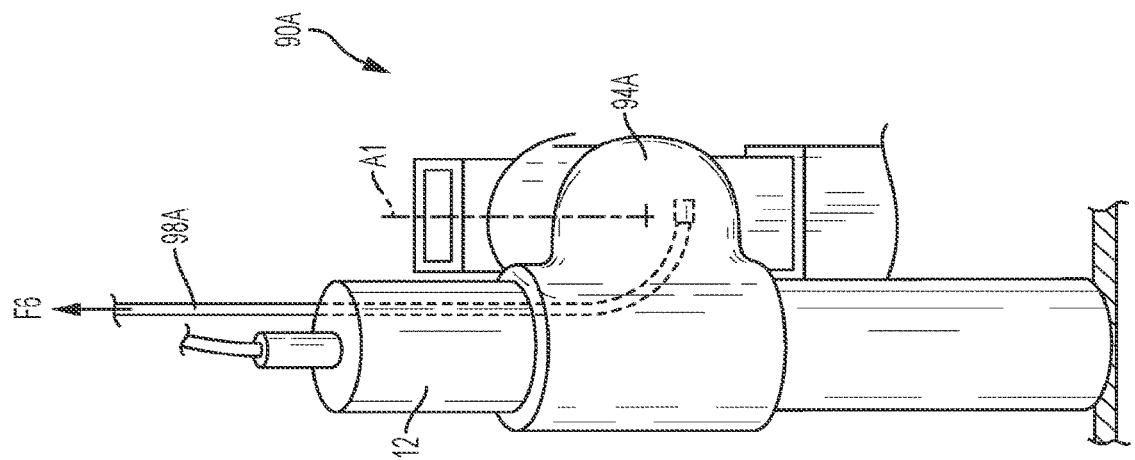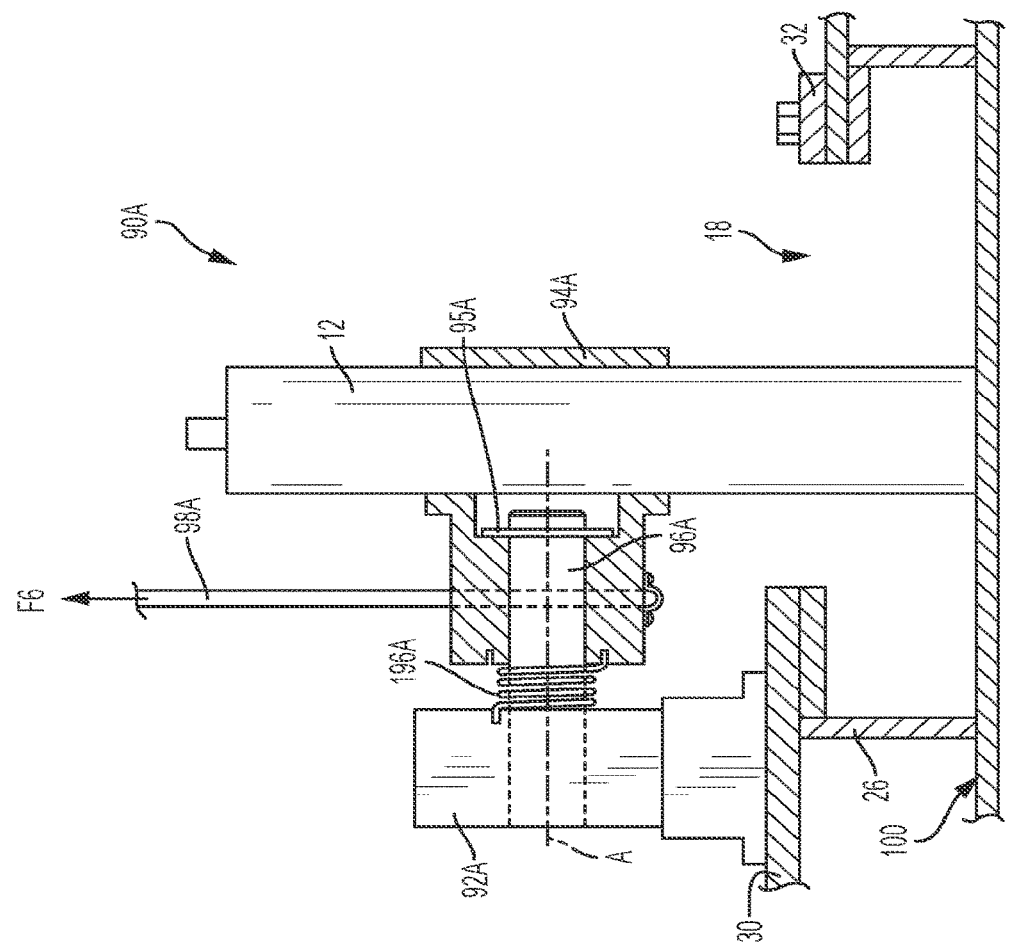

TANK MAINTENANCE ACCESS CHAMBER

CROSS-REFERENCE TO RELATED APPLICATIONS

This application is a divisional of U.S. patent application Ser. No. 15/756,536 filed on Feb. 28, 2018, which is a national phase filing under 35 U.S.C. § 371 of International Application No. PCT/US2016/041658 filed on Jul. 8, 2016, which claims the benefit under Title 35, U.S.C. Section 119(e) of U.S. Provisional Patent Application No. 62/212,943 filed on Sep. 1, 2015, the entire disclosures of which are hereby expressly incorporated herein by reference.

BACKGROUND

1. Technical Field

The present disclosure relates generally to a tank access chamber of a fueling system and, more particularly, to a tank access chamber configured to facilitate inspection and maintenance of the equipment contained therein without the need for a person to physically enter the tank access chamber.

2. Description of Related Art

Tank access chambers or sumps may be included in fueling systems to contain and protect the fuel system equipment positioned at the tank manway lid and allow it to be accessed for inspection, maintenance and repair. Such access chambers also function to contain fuel leaks to the chamber, thereby preventing release into the surrounding environment. Similarly, such access chambers also prevent water ingress frons the surrounding environment into the chamber and fueling system.

Current tank access chambers provide containment for Fuel system equipment. In some cases, a service technician desiring to perform inspection, maintenance and/or repair of equipment within the tank access chamber must physically enter the tank access chamber, e.g., by climbing below grade and into the cavity of the chamber, in order to access the equipment of interest.

Additionally, such equipment is often supplied by various manufacturers, such that compatibility between the interconnected components is not guaranteed. In some cases, this lack of compatibility may impair the function or working life of the service station.

SUMMARY

The present disclosure provides a fuel storage system with a tank access chamber having improved monitoring, servicing and maintenance capabilities. In particular, the chamber includes a sump monitored by a liquid sensor whose proper function can be automatically checked remotely, e.g., via an electronic controller or remote manual operation. In cases where such a check indicates a need for physical inspection of the sump sensor, the present system provides for sensor removal and installation by service personnel from a location outside the tank access chamber. Thus, the present system facilitates regular inspection and routine or unplanned maintenance without the need for a person to physically enter the tank access chamber.

In addition to such monitoring and maintenance functions, the present fuel storage system may also include strategic system redundancies, e.g., dual-wall storage tanks, service lines and fill ports. Individually and collectively, these systems and structures cooperate to ensure long term performance of the fuel storage system while preventing leaks and providing built-in protection for system users and service personnel.

In one form thereof, the present disclosure provides a control assembly for a fuel system including a sump, the control assembly comprising: a sensor having a distal end disposed within the sump, the sensor providing a liquid presence indication responsive to a liquid in the sump being at least at a threshold liquid level; a controller operably connected to the sensor and receiving the liquid presence indication; and a testing device operably connected to the sensor, the testing device comprising a distal actuator having a service configuration and a testing configuration, and a proximal control drivingly connected to the distal actuator, wherein actuation of the proximal control toggles the distal actuator between the service configuration and the testing configuration, and wherein in the testing configuration the distal actuator changes a physical configuration of the sensor to cause the sensor to provide the liquid presence indication when the liquid is below the threshold liquid level.

In another form thereof, the present disclosure provides a method of assessing a function of a sensor, the method comprising: installing a sensor in a sump of a fuel dispensing system, such that the sensor extends downwardly into the sump to monitor for fluid infiltration of into the sump; and after installing, assessing the function of the sensor without physically accessing the sump.

In another form thereof, the present disclosure provides a fueling system assembly comprising: a sump; a sensor having a distal end disposed within the sump, the sensor defining an actuated physical configuration indicative of the presence of liquid within the sump at or above a threshold level and a non-actuated physical configuration indicative of the absence of liquid within the sump at or above the threshold level; a magnetic sensor retainer fixed adjacent the sump via at least one magnet received on a ferromagnetic surface, the magnetic sensor retainer having the sensor affixed thereto.

In yet another form thereof, the present disclosure provides a fueling system assembly comprising: a sump; a sensor having a distal end disposed within the sump, the sensor defining an actuated physical configuration indicative of the presence of liquid within the sump at or above a threshold level and a non-actuated physical configuration indicative of the absence of liquid within the sump at or above the threshold level; a remote sensor locator fixed adjacent the sump, the remote sensor locator defining a funnel-shaped guide cavity having an aperture at a distal end sized to snugly receive the corresponding distal end of the sensor, and a proximal end sized to receive the distal end of the sensor with substantial clearance.

BRIEF DESCRIPTION OF THE DRAWINGS

The above mentioned and other features and advantages of this disclosure, and the manner of attaining them, will become more apparent and the invention itself will be better understood by reference to the following description of embodiments of the invention taken in conjunction with the accompanying drawings, wherein:

FIG. 19 is a cross section, elevation view of a cam-operated sensor tester made in accordance with the present disclosure, having a sump liquid sensor in a monitoring position within a sump;

FIG. 20 is a cross section, elevation view of a cam shaft and sensor housing of the cam-operated sensor tester of FIG. 19, taken along the line XX-XX of FIG. 19;

FIG. 24 is a cross section, elevation view of another cable operated sensor tester, in which the sensor is shown in its monitoring position within a sump;

FIG. 25 is a perspective view of the cam operated sensor tester shown in FIG. 24, illustrating an off-center sensor housing pivot.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
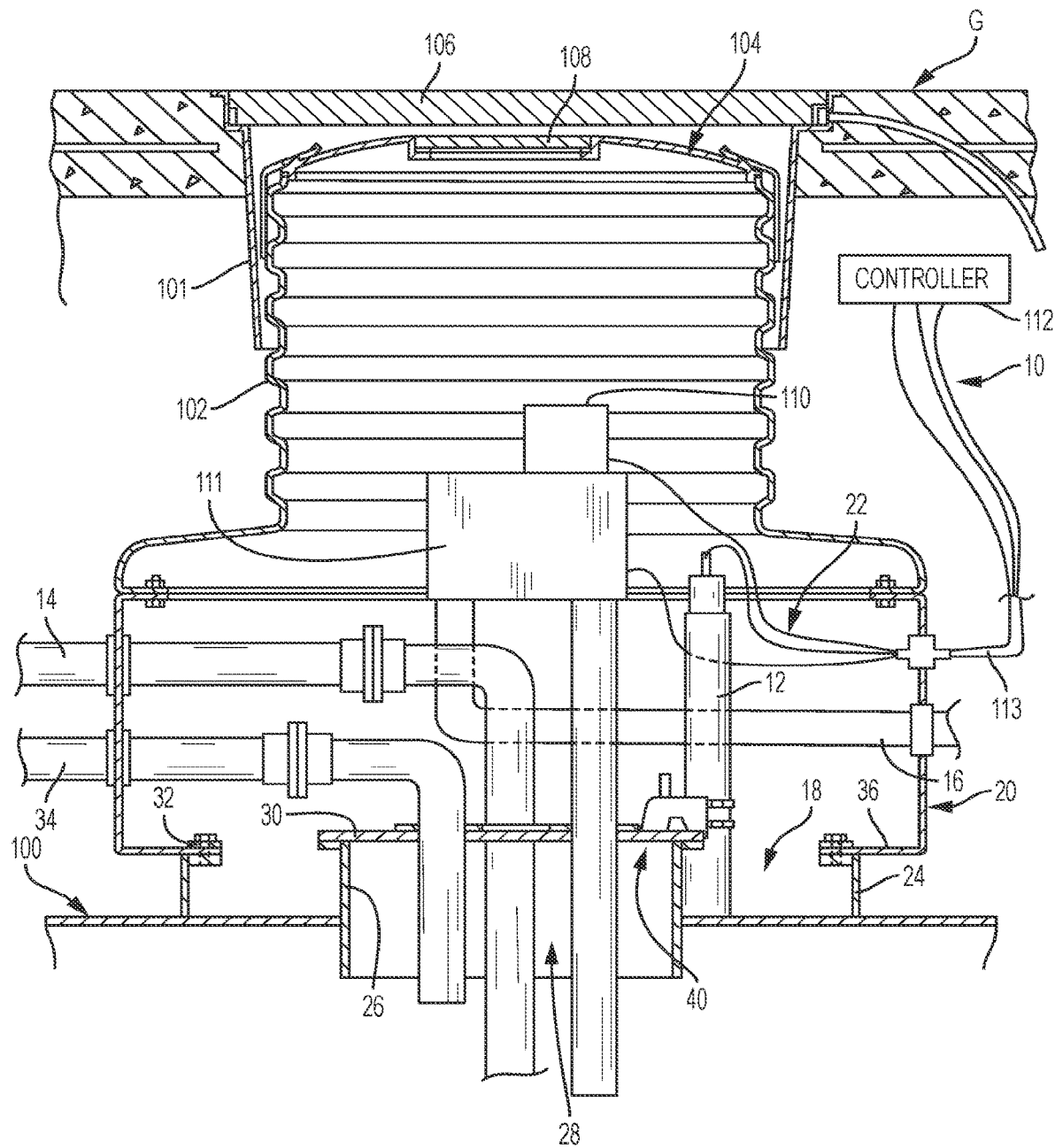
FIG. 1 is a cross section, elevation view of a tank access chamber assembly made in accordance with the present disclosure, shown in a below-grade installation with an underground storage tank.
Figure 8:
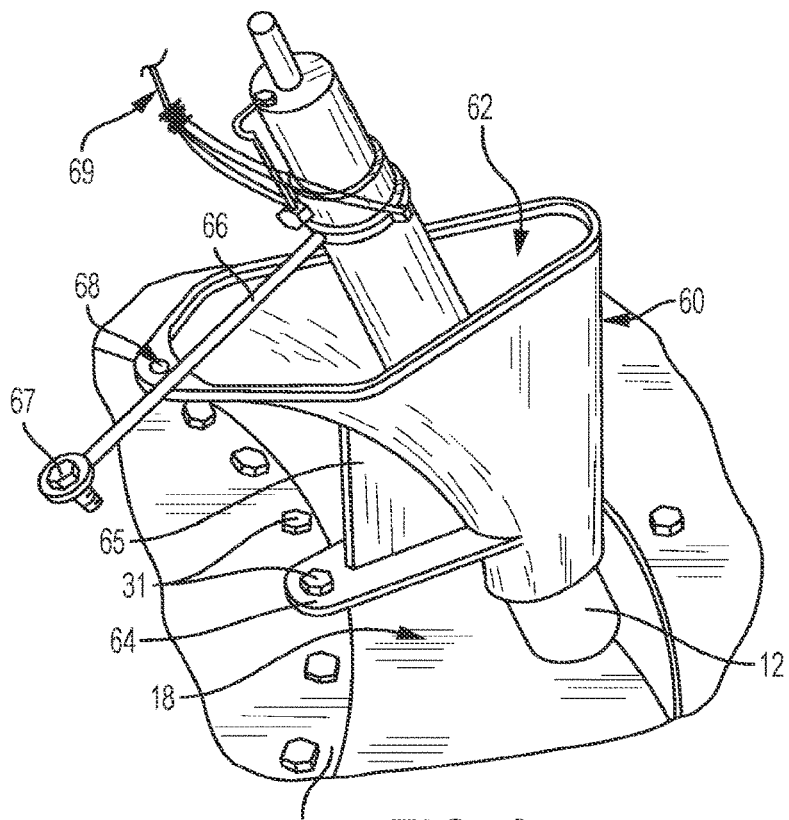
FIG. 8 is another perspective view of the sensor, sump, and scoop-shaped sensor locator shown in FIG. 7, in which the liquid sensor has been disengaged from the sensor locator.

The present disclosure provides tank access chamber assembly 10, shown in FIG. 1, including a sensor 12 which monitors a sump 18 for fluid ingress within the tank access chamber 22. As described in detail below, sensor 12 is actuated by the presence of a threshold level of fluid in sump 18, but may also be remotely actuatable, manually and/or automatically, in order to check and verify proper sensor function, via any of a number of remote actuation mechanisms. Sensor 12 may also be held in place adjacent sump 18 by magnetic sensor retainer 40 (FIG. 2), and/or may be guided into a proper position and orientation by sensor locator 60 (FIG. 8). In instances where it is determined that sensor 12 must be physically retrieved from tank access chamber 22, extraction tool 50 (FIG. 5) or other retraction device may be provided to disengage the strong magnetic attachment provided by retainer 40 to facilitate retrieval of sensor 12 without the operator having to physically enter tank access chamber 22. For purposes of the present discussion, tank access chamber 22 is described and illustrated with respect to, e.g., monitoring and retrieval of sensors such as sensor 12. However, it is also contemplated that other fuel system chambers or cavities, such as the interior of a spill containment system for example, may also be used in connection with the technologies described herein.

In the exemplary embodiment of FIG. 1, tank access chamber assembly 10 has a fuel intake pipe 14, commonly referred to as a filling line, which receives fuel from an outside source (e.g., a fuel tanker truck) and transfers the fuel to underground storage tank 100. Typically, pipe 14 extends to or near the bottom of tank 100. Assembly 10 also includes a fuel discharge pipe 16, commonly referred to as a product delivery line, which withdraws fuel from the bottom of tank 100 and discharges the fuel to an end user, e.g., a customer using a fuel station pump to fuel a vehicle. Pipes 14, 16 pass through sidewall 38 of tank 20, and through manway lid 30 received in manway riser 26. A pump is used to withdraw fuel from tank 100 via discharge pipe 16, such as a submersible pump located at or near the bottom of tank 100 which pressurizes fuel within pipe 16, or a dispenser pump located outside tank 100 which creates suction within pipe 16. A tank collar 24 extends from the outer wall of storage tank 100 to tank 20, forming sump 18.

In some applications, a monitoring system may be in fluid communication with a vacuum generator, which is monitored by a secondary containment control module 110 as further described below. Generally speaking and for simplicity of FIG. 1, tank access chamber assembly 10 is shown with fewer systems than might be used within chamber 22. Of course, any and all additional systems described herein may be also used in connection with assembly 10, including a submersible pump manifold 111 in connection with module 110 (see also FIG. 4A), a vent pipe 34 used for preventing undue pressure buildup in tank 100, and other systems.

Tank 20 is installed below grade G, with riser 102 extending upwardly from the upper end of tank 20 to just below grade G. A gravel guard 101 may be provided around the proximal periphery of riser 102, as shown. A sub-grade lid 104 is received on a proximal end of riser 102, and in some installations, may have a transparent viewing port 108 formed therein for visual inspection of tank access chamber 22 without removing sub-grade lid 104. A grade-level lid 106, commonly referred to as an access cover, is received in a concrete support ring to protect tank access chamber assembly 10 from vehicles and the like.

For purposes of the present disclosure, "distal" structures are considered to be relatively further from a user or operator of assembly 10 who is positioned at or above grade G as shown in FIG. 1, while "proximal" structures are considered to be relatively closer to such a user. For example, when sensor 12 is in the installed configuration of FIG. 1 and monitoring sump 18 for fluid as described below, the distal end of sensor 12 is the "bottom" portion of the sensor further from grade G, while the proximal end of sensor 12 is the "top" portion of sensor 12 closer to grade G.

For purposes of the present disclosure, a "fuel pipe" is a pipe suitable for the transmission of hydrocarbon fuels, such as gasoline and diesel. Fuel pipes are suitable for use with such materials, and are designed for safe operation in potentially explosive atmosphere. Fuel pipes may be made of certain exemplary materials such as High Density Polyethylene lined with Ethyl Vinyl Alcohol, Nylons, fiberglass or metal. Moreover, suitable fuel pipes may be produced from hydrocarbon-resistant materials and may be made with an internal anti permeation layer to ensure hydrocarbon materials cannot leach through the wall of the pipe. Polymeric pipes are generally multi-layered to achieve a combination of strength and flexibility and permeation resistance. Suitable materials may include thermoplastics, thermoset materials and steel, for example.

1. Magnetic Sensor Brackets

Figure 2:
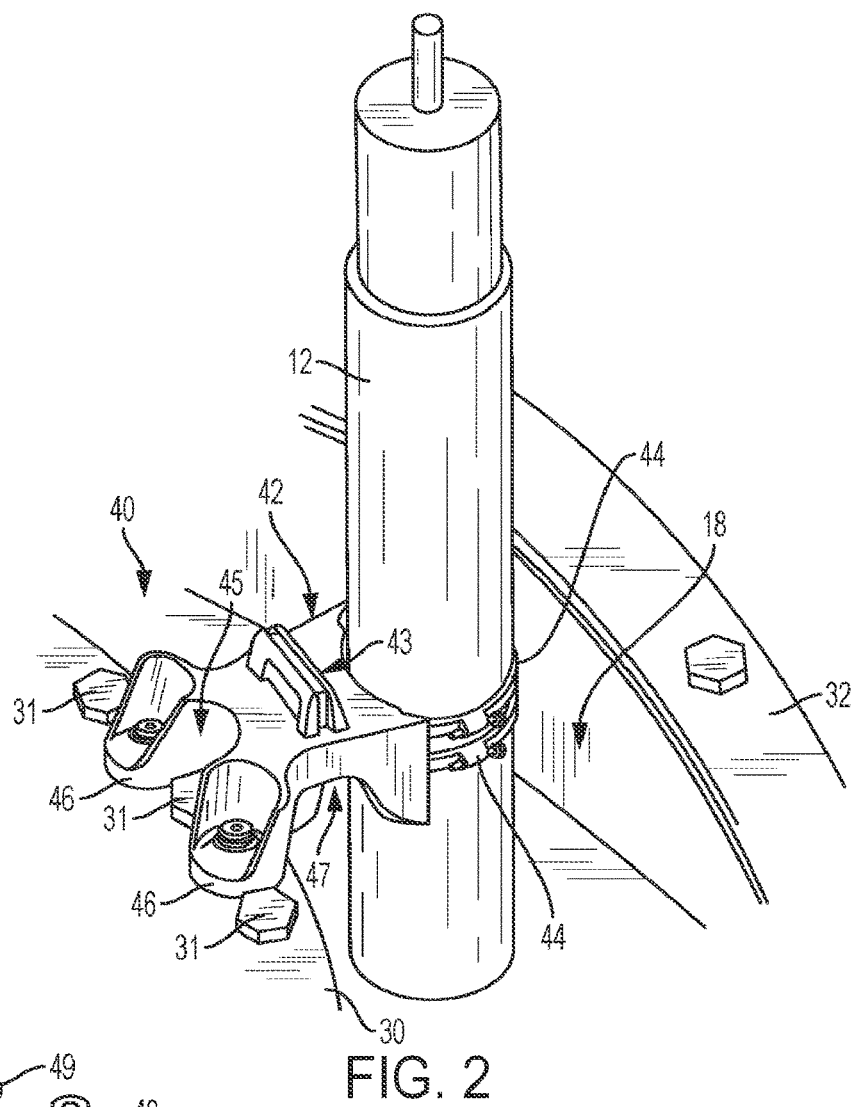
FIG. 2 is a perspective view of a liquid sensor positioned to detect fluid entry within a sump of the tank access chamber assembly shown in FIG. 1, in which the sensor is held in place by a magnetic sensor retainer.

Turning to FIG. 2, magnetic sensor retainer 40 is shown with liquid sensor 12 affixed thereto via adjustable clamps 44 which attach to body 42 of retainer 40 and wrap around sensor 12. In an exemplary embodiment, clamps 44 are similar to hose clamps, having a rotatable worm drive which engages a series of slots in the body of the clamp to expand or contract the diameter of the clamp to secure sensor 12 to body 42 of retainer 40. In the illustrated embodiment, clamps 44 are passed through slots formed in retainer body 42 to fix clamps 44 to body 42 and thereby enable fixation of sensor 12 to retainer 40.

In use, magnetic sensor retainer 40 is fixed to sump liquid sensor 12, and magnetically attached to the ferromagnetic material (e.g., steel) of tank manway lid 30 such that retainer 40 holds the sensor 12 in a desired orientation and position.

One such desired orientation and position is a working or monitoring configuration in which the distal end of sensor 12 is positioned in sump 18 adjacent to the bottom of the tank access chamber 22, and the sensor 12 is oriented generally upright and vertical as illustrated. As described further below, magnetic sensor retainer 40 includes geometry which allows it to be located either around or over top of a tank manway fixing bolt 31. Retainer 40 also incorporates geometry to allow an extended extraction tool 50 (FIG. 5) to be used to retrieve sensor 12 from its monitoring configuration without requiring an operator to physically enter the tank manway. In particular, extraction tool 50 can be used to bring sensor 12 to grade level G (FIG. 1) for inspection, maintenance and/or repair. Sensor 12 may then be lowered from grade level G and replaced back in its original position by tool 50.

Figure 3:
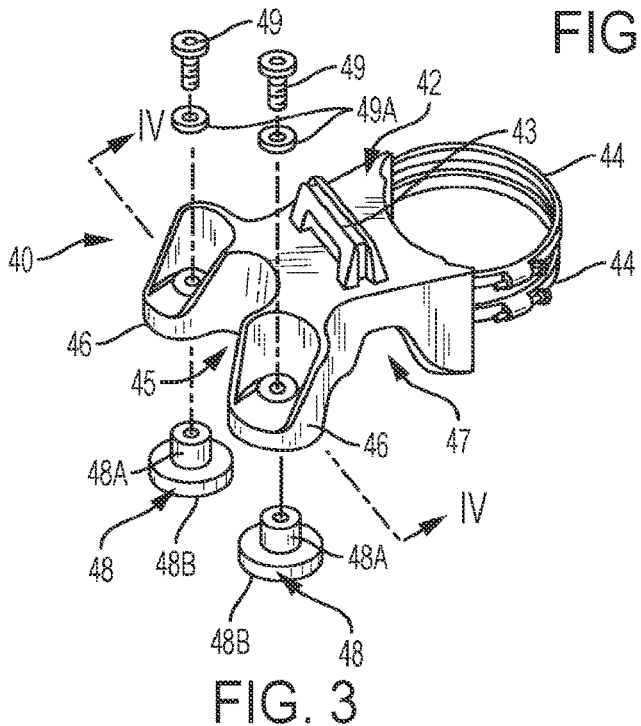
FIG. 3 is a perspective, exploded view of the magnetic sensor retainer shown in FIG. 2.
Figure 4:
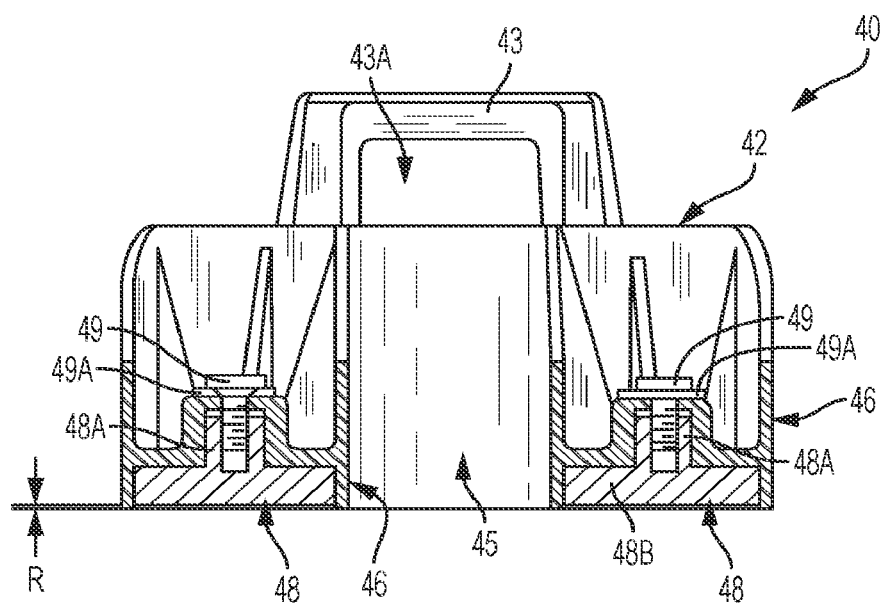
FIG. 4 is an elevation, cross section view of the magnetic sensor retainer shown in FIG. 3, taken along the line IV-IV of FIG. 3, and with the retainer fully assembled as shown in FIG. 2.

As best shown in FIGS. 2 and 3, magnetic sensor retainer 40 includes a pair of mounting feet 46 defining an undersurface cavity sized to receive magnets 48 (FIG. 4). In an exemplary embodiment, the cavities within feet 46 and magnets 48 are sized such that the distal surface of each magnet 48 is recessed relative to the adjacent distal surface of the foot 46 by a distance R (FIG. 4) when magnets 48 are fully seated and installed. This recessed configuration protects the material of magnet 48 from contact with the metal to which the feet are secured (e.g., the proximal surface of manway lid 30), minimizing or eliminating the potential for sparks forming from metal-on-metal contact during installation or removal of sensor retainer 40 to lid 30 or any other metal surface within tank access chamber 22.

Magnets 48 are secured within the cavities of feet 46 by fasteners 49. In the exemplary embodiment of FIG. 3, for example, each of the pair of magnets 48 includes a magnet base 48B with a cannulated boss 48A extending upwardly therefrom. Boss 48A has a threaded internal aperture for threadably receiving fastener 49. As illustrated, a fastener 49 is threaded into boss 48A of each magnet 48 to draw and seat the magnets 48 firmly within the cavity defined by feet 46 and against the upper wall thereof. Washers 49A may be interposed between the fasteners 49 and the adjacent surfaces of feet 46 of magnetic sensor retainer 40.

The bottom portion of retainer body 42, including feet 46, is sized to be positioned at a periphery or lip of a cover or other surface adjacent to sump 18, such as along the periphery of manway lid 30 as shown in FIG. 2. In this way, feet 46 may be securely magnetically fastened to the surface of the cover 30 while sensor 12 is positioned beyond the periphery of cover 30, such that sensor 12 can extend downwardly below the cover into sump 18 around the bottom of the manway area. As discussed further below, a distal portion of sensor 12 includes a liquid sensor, such as a float, which will be actuated if an unacceptable threshold level of fluid accumulates within sump 18. In the illustrated embodiment, sump 18 is a relatively small area within tank access chamber 22 and is positioned and configured to be the first area of the tank access chamber 22 to fill with liquid (e.g., hydrocarbons or water) in the event of a breach of the manway or a leak into sump 18.

In order to facilitate this positioning of retainer 40 and sensor 12, main body 42 of magnetic sensor retainer 40 defines a concave channel or cavity 45 disposed between feet 46. As illustrated in FIG. 2, cavity 45 sized to receive the head of a bolt 31, which may be one of the series of bolts secured around the periphery of manway lid 30. Feet 46 are sized to be received in the open space between neighboring pairs of such bolts 31. In this way, the bottom portion of body 42 of retainer 40 fits around the head of peripheral bolts 31 of manway lid 30, with such bolts 31 not interfering with placement of the bracket flush against the upper surface of manway lid 30. When flush, the lower surfaces of magnet bases 48B may be substantially parallel to the adjacent upwardly facing mounting surface, e.g., the upper surface of manway lid 30.

The bottom portion of body 42 of retainer 40 may also include channel 47 formed along a lower surface thereof, as shown in FIGS. 2 and 3. This channel 47 is also sized to be received over the head of any nearby bolts, such as bolts 31, without interfering with the flush mounting of retainer 40 upon the upper surface of lid 30. Channel 47 may be used in some applications where cavity 45 is not compatible with the structures at the periphery of sump 18, such as installations where the bolt pattern or size at the edge of manway lid 30 is not compatible with the spacing and/or sizing of feet 46 and cavity 45.

Body 42 of magnetic sensor retainer 40 includes a raised tool engagement stanchion 43 which extends upwardly from body 42 and defines an aperture 43A (FIG. 4) above the adjacent upwardly facing surface of body 42 and within stanchion 43. As further described below, the aperture 43A of tool engagement stanchion 43 is sized to receive a corresponding distal portion of an installation/extraction tool 50 which can be used to install or remove magnetic sensor retainer 40 from its mounting surface within tank access chamber 22, e.g., the upper surface of manway lid 30.

Figure 4A:
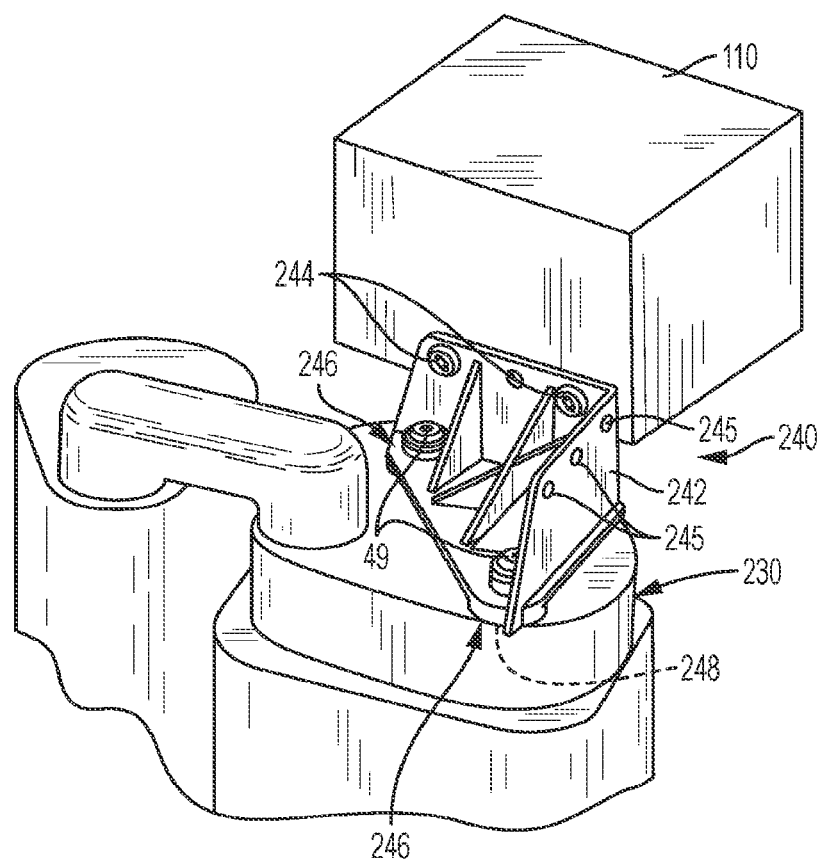
FIG. 4A is a perspective view of a magnetic module retainer made in accordance with the present disclosure, in which a module is attached to a manifold via the module retainer.

Magnetic sensor retainer 40 is shown and described in connection with mounting sensor 12 within tank access chamber 22, but it is contemplated that similarly constructed magnetic retainers may be used for other equipment within access chamber 22 as required or desired for a particular application. For example, FIG. 4A shows a magnetic module retainer 240 for retrieving and replacing a secondary containment monitoring (SCM) control module 110. Magnetic module retainer 240 utilizes similar design features and operational principles as magnetic sensor retainer 40 described above, and corresponding structures and features of magnetic module retainer 240 have corresponding reference numerals to magnetic sensor retainer 40, except with 200 added thereto. However, magnetic module retainer 240 is adapted for use with SCM module 110, which occupies an elevated position within access chamber 22 relative to liquid sensor 12 as further described below.

SCM module 110 forms a part of a Secondary Containment Monitoring (SCM) system which may be employed in a system of the present disclosure, as further described in detail below. SCM module 110 is secured in place using magnetic retainer 240 as illustrated in FIG. 4A, with retainer specifically adapted to interface with manifold 230 (which may be similar or identical to manifold 111 described above) rather than lid 30 as described above. Magnetic module retainer 240 includes two upward extending walls 242, each with three apertures 245 to engage fasteners 244 for securing the SCM module 110 to module retainer 240. The magnets 248 (not shown) of module retainer 240 used to secure the SCM module 110 in place atop manifold 230 utilize the same structure and configuration of magnets 48 described above, and may be identical. Notably, feet 246 are configured to recess the distal surfaces of magnets 248 in the same way that magnets 48 are recessed by distance R, as described above, to provide spark protection by preventing magnets 248 from contacting the adjacent surface of manifold 230.

Moreover, it is contemplated that further alternative arrangements of magnetic retainer 40 may be utilized in connection with tank access chamber assembly as required or desired for a particular application, in order to provide remote accessibility to various system components without requiring the user to physically enter tank access chamber 22 as described herein.

2. Remote Extraction Tool and Method

Figure 5:
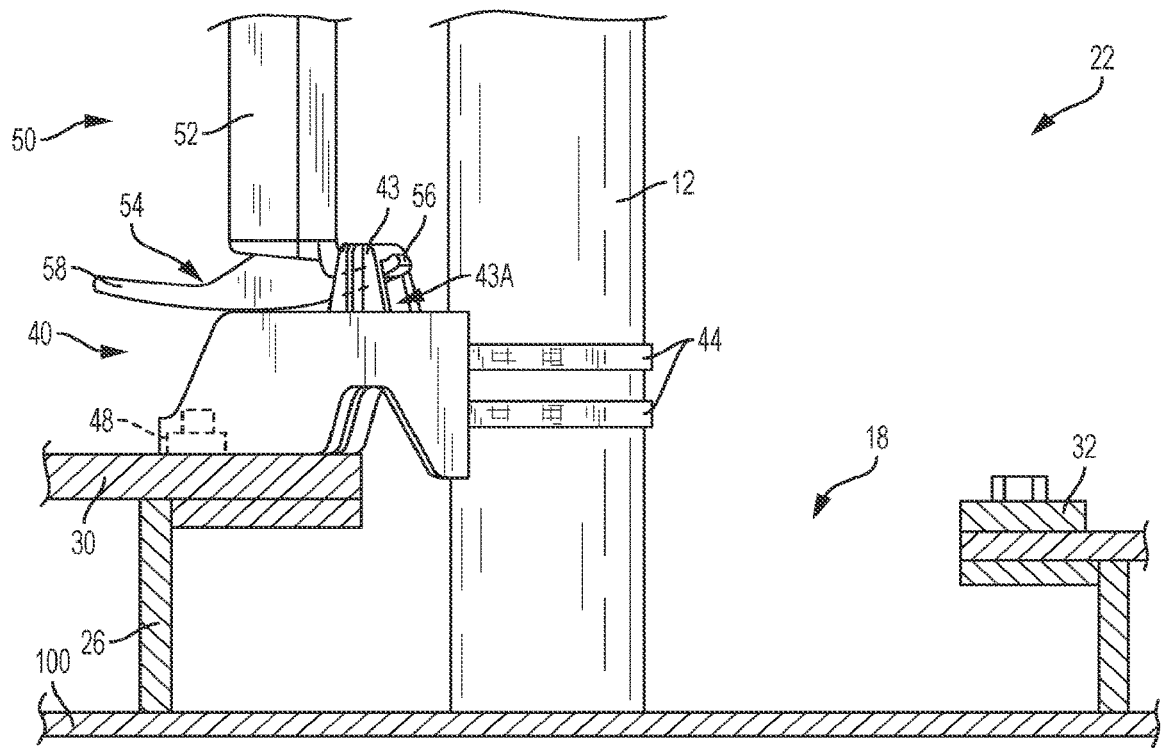
FIG. 5 is a cross section, elevation view of the sensor, sump, and retainer of FIG. 2, shown with an extraction tool engaging the sensor retainer.
Figure 6:
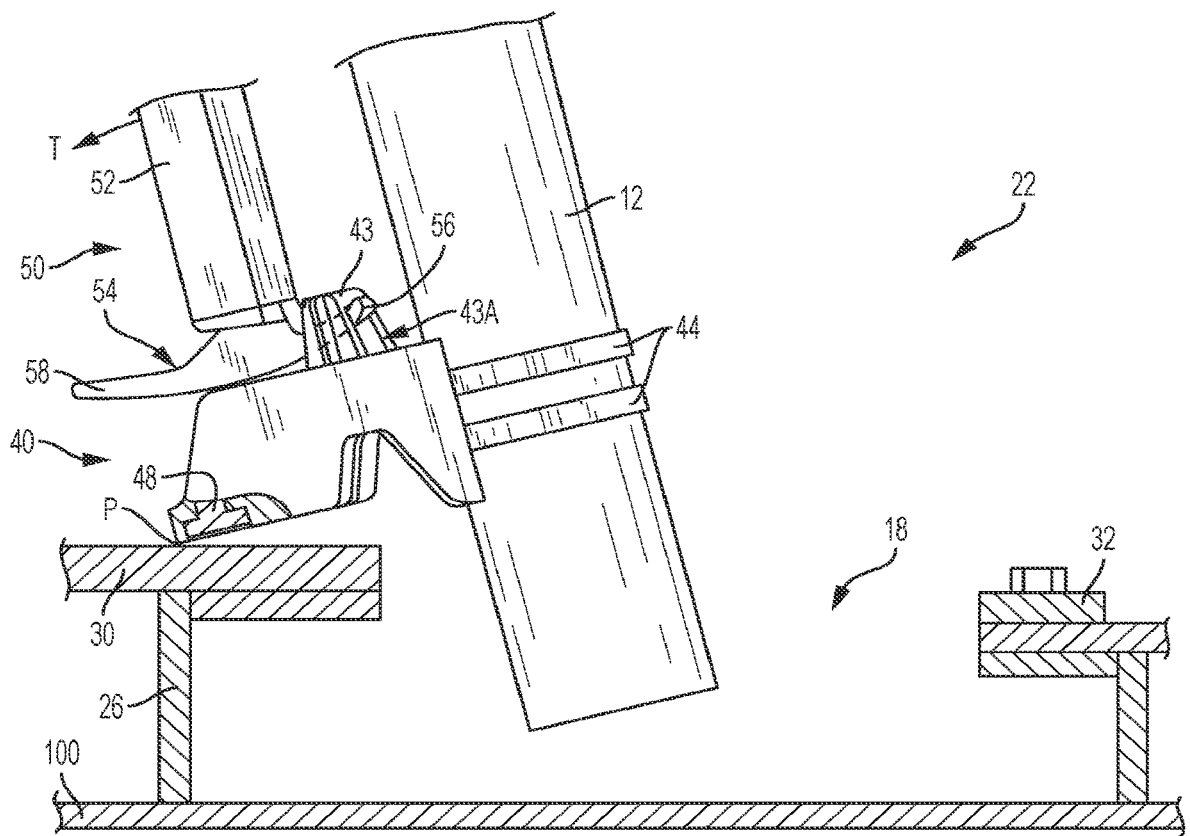
FIG. 6 is another perspective view of the sensor, sump, and retainer of FIG. 5, in which the extraction tool has disengaged the retainer from its seated position.

Referring to FIGS. 5 and 6, extraction tool 50 may be lowered into tank access chamber 22 while the operator of the tool remains physically out of the tank access chamber and above grade G (FIG. 1). Extraction tool 50 includes an elongated shaft forming handle 52 having a length appropriate to the depth of the manway and the vertical distance between grade G and sensor 12 (FIG. 1). At the far, or distal, end of the shaft, a magnetic retainer engagement device 54 is attached to handle 52. Engagement device 54 includes a head having an extension or "hook" 56 sized to be received in the aperture 43A of stanchion 43 of magnetic sensor retainer 40. The head of the extraction tool further includes at least one foot 58 extending opposite the extension/hook. The foot is sized to rest atop the top surface of magnetic sensor retainer 40 from which the tool engagement feature extends. In an exemplary embodiment, the materials chosen for construction of extraction tool 50 are spark-resistant and suitable for use in potentially explosive atmosphere.

To disengage magnetic sensor retainer 40 from its magnetically-affixed configuration at the upper surface of manway lid 30, retainer engagement device 54 is lowered through tank access chamber from grade G until hook 56 is adjacent retainer 40. Retainer engagement device 54 is then moved sideways (e.g., laterally) to position hook 56 in aperture 43A defined by the stanchion 43 as shown in FIG. 5. Foot 58 is rotated into position to engage the upper surface of the magnetic sensor retainer 40, while the upper surface of hook 56 is engaged with a lower surface of stanchion 43 within aperture 43A as illustrated.

From the engaged position of FIG. 5, handle 52 of extraction tool 50 is further rotated along direction T, as shown in FIG. 6. This rotation provides a lifting force on stanchion 43 and a counterbalancing downward force on the upper surface of retainer 40, which cooperates to form a torque about rotation point P. This torque lifts magnets 48 from magnetic engagement with manway cover 30, as illustrated, thereby increasing the distance therebetween and essentially eliminating the magnetic retention force such that sensor 12 can then be freely moved, e.g., upwardly toward grade G. In this way, the geometry of retainer engagement device 54 cooperates with the length of handle 52 of extraction tool 50 to provide the proper mechanical advantage in the form of a lever to break the magnetic securement of the magnetic sensor retainer 40 to the manway cover 30.

In an exemplary embodiment, the magnets used to hold magnetic sensor retainer 40 in place cooperate to hold the magnetic sensor retainer 40 in place with a 35-kilogram pull force needed to dislodge the magnets from their location. This pull force is high enough to prevent removal of the bracket by a direct upward pull, but low enough to allow the sensor to be rotated out of engagement using the leverage of the extraction tool, as described herein. In an exemplary embodiment, handle 52 of extraction tool is between 5 feet and 7 feet long in order to provide adequate length for above-grade access to the distal portion of a typical tank access chamber 22 having a depth between 3 and 5 feet.

3. Remote Sensor Locator

In addition to, or as an alternative to, the use of magnetic sensor retainer 40 in connection with sump liquid sensor 12, a scoop-shaped remote sensor locator 60 (FIGS. 7-8) may be provided with geometry to facilitate removal and, in particular, replacement of sensor 12 from grade G by use of an elongate control device such as extraction tool 50 or a lanyard. The locator 60 guides sensor 12 toward its monitoring position as sensor 12 is lowered into position from grade G, and may also firmly hold sensor 12 in this configuration as further described below.

Figure 7:
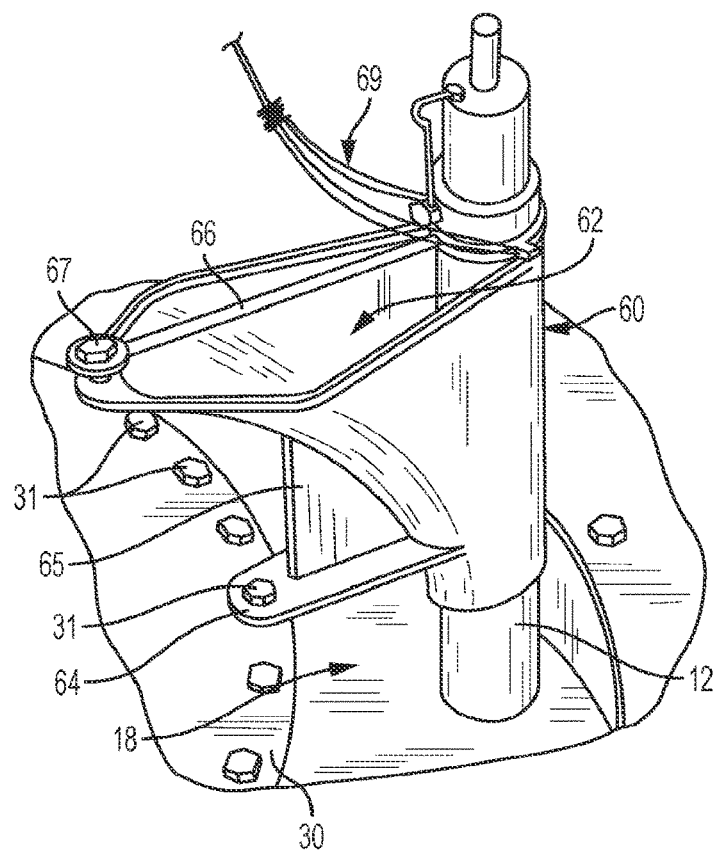
FIG. 7 is a perspective view of a scoop-shaped sensor locator made in accordance with the present disclosure, illustrated in an installed configuration adjacent a liquid sump and with a sump liquid sensor installed therein.

Referring to FIG. 7, remote sensor locator 60 is accessible from above grade G (FIG. 1) and features a "scoop" or funnel-shaped guide cavity 62, a mounting portion 64 which is attached to manway lid 30 via one of the manway lid bolts 31, and a removable locking arm 66 which selectively holds sensor 12 in its generally upright and vertical monitoring configuration. Mounting portion 64 may include a stiffening rib 65 spanning the gap between the laterally-directed arm connected to bolt 31 and the adjacent wall of the funnel-shaped portion of locator 60, in order to provide strength and rigidity to mounting portion 64 and overall assembly.

At the distal end of guide cavity 62 is an aperture sized to snugly receive the corresponding distal end of sensor 12, which is to say the periphery of the distal end holds the body of sensor 12 firm and fast in the monitoring configuration and with minimal radial translation (e.g., a fraction of an inch). The proximal end of guide cavity 62 is sized to receive the distal end of sensor 12 with substantial clearance. In one embodiment, the proximal end has a cross-sectional opening area at least 3 times the cross-sectional area of the distal end of the sensor 12. Sensor 12 is lowered into the wide proximal opening of guide cavity 62 and is gradually directed to a particular position with respect to lid 30 by the snug distal fit.

When the sensor is positioned in its monitoring position as shown in FIG. 7, a locking arm 66 fixed to the sensor (e.g., by being affixed to the exterior of the sensor body at a desired position) is aligned with a corresponding aperture in the proximal rim of sensor locator 60 as illustrated. In particular, a bolt 67 received through a corresponding aperture 68 (FIG. 8) formed in locking arm 66 can be aligned with a threaded aperture 68 in the proximal rim of sensor locator 60 and the bolt 67 received therein to lock sensor 12 in place at a desired rotational orientation and axial position (e.g., the monitoring configuration as described herein). In an alternative embodiment, a quick-release mechanism may be provided in lieu of bolt 67, such as a bayonet fitting or the like.

Lanyard 69 may be fixed to the locking arm or the sensor, and may extend upward to or near grade level G in order to facilitate grasping of sensor 12 from grade level G by an operator, who need not be physically within the manway to raise and lower the sensor. Bolt 67 used to secure the locking arm can be installed or removed by a long tool from above grade G, such as a socket wrench with a long extension.

The above-described locator 60 and magnetic retainer 40 can be used for any sensors within the manway, and more than one locator 60 and/or magnetic retainer 40, or combination thereof, may be used to secure multiple sensors within the manway as required or desired for a particular application.

In some embodiments of the disclosure, certain sensors may be positioned just below grade level G within tank access chamber 22 such that the sensors are accessible within the normal (e.g., arms-length) reach of a technician. If it becomes necessary to access the tank access chamber 22 distal of these proximally-mounted sensors, the proximally-mounted sensors can be removed to allow access to distal structures.

4. Automated Sensor Monitoring and Testing

In some embodiments, provision may be made for remote actuation of sensor 12 such that the sensor is actuated in the same manner as would occur if a threshold level of fluid is present in sump 18. As described in detail below, such remote actuation may be accomplished with an actuator that pushes a float upwardly within the sensor body, or by rotating sensor 12 upwardly via a pivotable attachment such that the float moves within the sensor body under the force of gravity. When remotely actuated, verification of proper sensor function may be accomplished without having to remove sensor 12 from tank access chamber 22 or, in some cases, without having to remove lids or expose chamber 22 at all. Remote actuation may also be automated by a motor, linear actuator or other suitable controller-connected force generator, such that function testing of sensor 12 and the results of such testing may be integrated into a microprocessor-based monitoring and control system. In an exemplary embodiment, any actuator used within tank 20, including actuators for remote actuation of sensor 12 as described herein, are suitable for operation in a potentially explosive atmosphere. Such actuator may be hydraulic, pneumatic or electrical. In the case of electrical actuators, proper provision may be provided for operation in a potentially explosive atmosphere, as may be evidenced by, e.g., ATEX or IECEx certification.

Figures 26, 27:
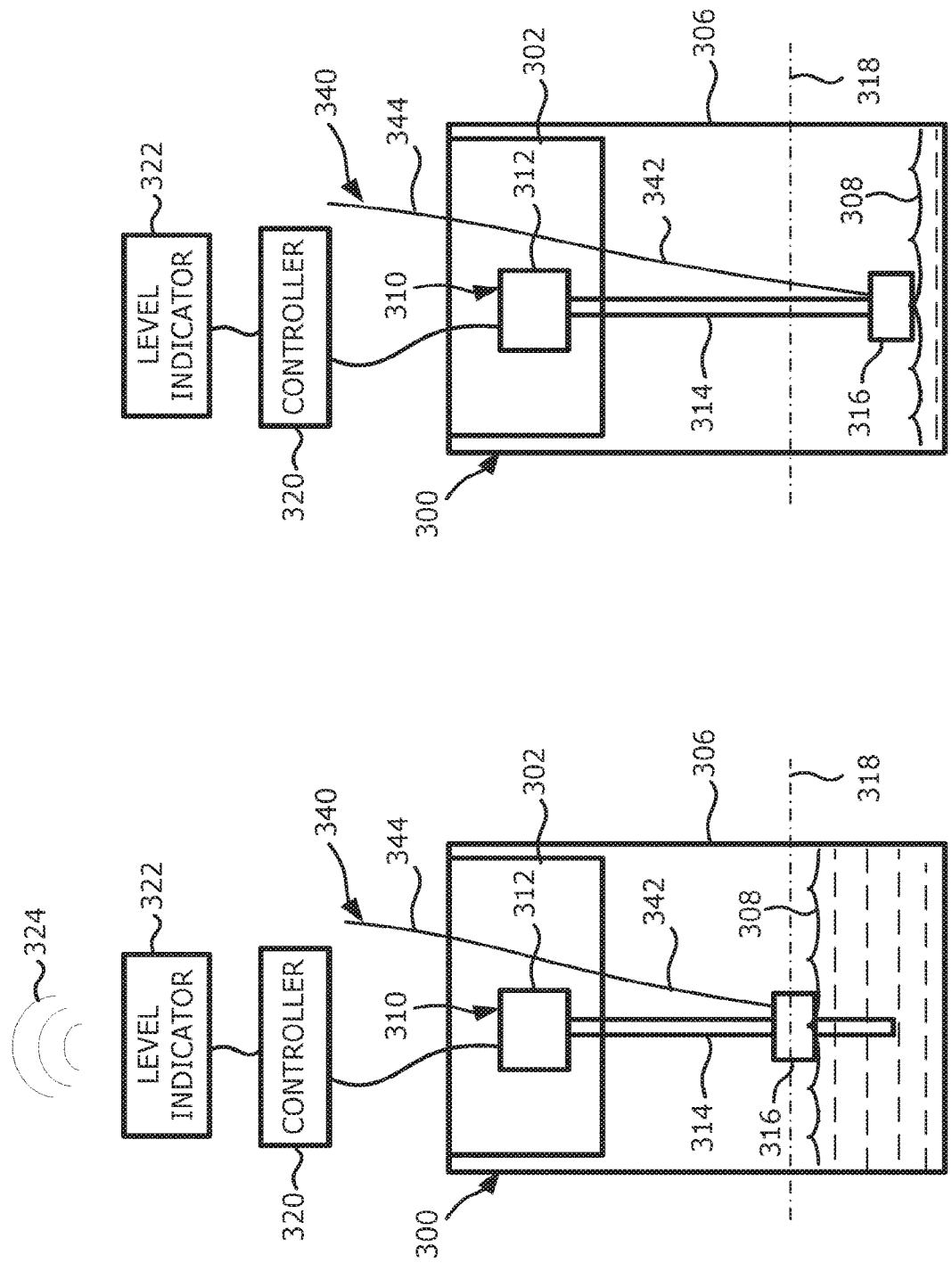
FIGS. 26-28 are block diagrams depicting operation of an embodiment of a liquid sensor operably coupled to a testing device.
Figure 28:
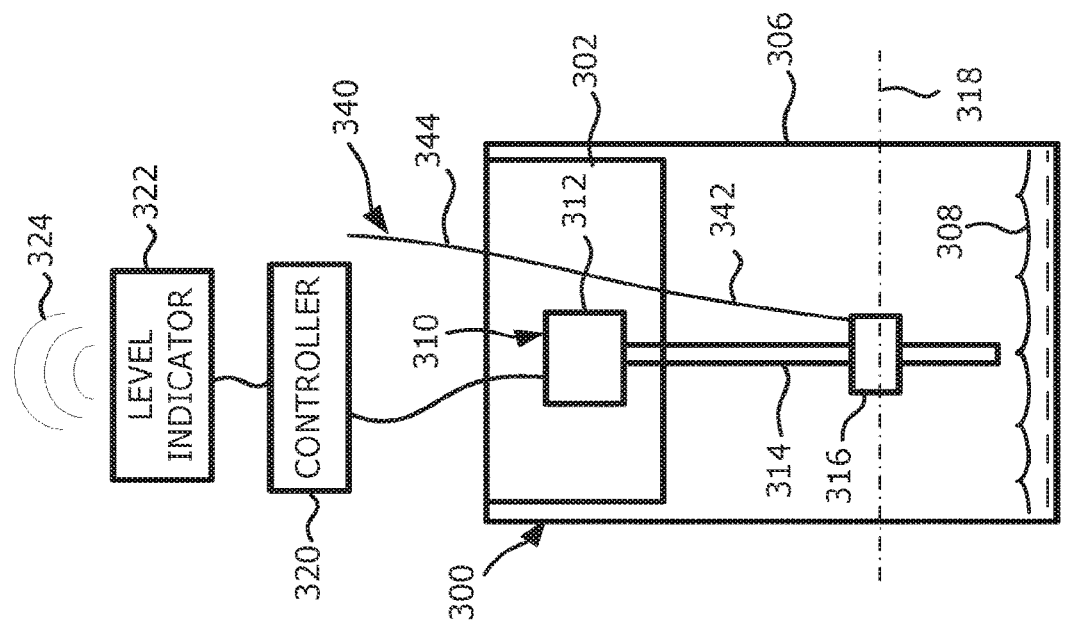

FIGS. 9-25 illustrate various arrangements of testing devices for testing and verifying the operability of sump liquid sensor 12, such as by manually or automatically actuating sensor 12 from a remote location outside of tank access chamber 22. Such a remote location may be at or above grade G, as shown in FIG. 1, or a control room in the vicinity of underground storage tank 100, for example. FIGS. 26-28 are block diagrams described to illustrate operation of an embodiment of testing device and, more generally, the functionally of testing devices according with the invention. The testing device includes a distal actuator operably connected to sensor 12 and capable of actuating sensor 12 in the absence of the threshold level of fluid in sump 18, as described in detail below with respect to various exemplary embodiments. The distal actuator is toggleable between a service configuration and a testing configuration. The toggling of the distal actuator is accomplished via a proximal control located, in certain configurations, outside tank access chamber 22 and drivingly connected to the distal actuator. In the service configuration, the distal actuator does not interfere with the regular, in-service operation of liquid sensor 12 such that sensor 12 remains in a non-actuated configuration when sump 18 is substantially free of liquid and toggles to an actuated configuration if liquid (e.g., hydrocarbons or water) infiltrates sump 18. In the testing configuration, the actuator physically toggles the sensor 12 to the actuated configuration even if no liquid is present in sump 18.

As described in detail below, the proximal control may be a manual control (e.g., human-powered) directly mechanically connected to the distal actuator and selectively toggleable by an operator's application of force to the proximal control. Alternatively, the proximal control may be an automatic control (e.g., electrically-powered, pneumatically-powered or hydraulically-powered) operably connected to the distal actuator and mediated by an electronic controller which toggles the distal actuator by issuance of a control signal to force generator (e.g., an actuator or motor) which, in turn, is mechanically connected the distal actuator.

Figure 9:
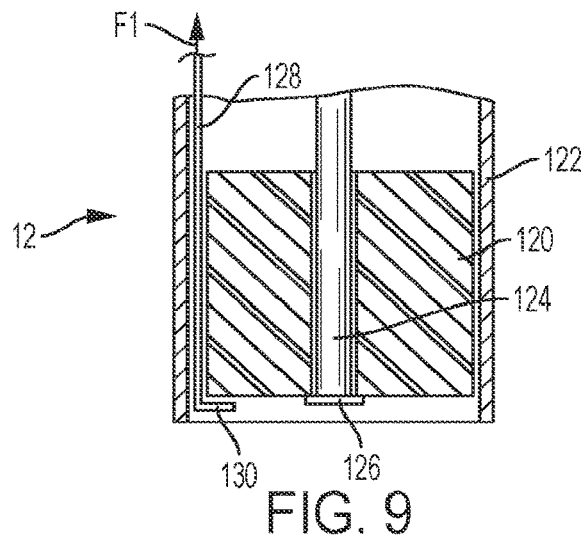
FIG. 9 is a cross section, elevation view of a distal end of a sump liquid sensor made in accordance with the present disclosure, including a first test actuation mechanism.

Turning now to the illustrative embodiment of FIG. 9, sump liquid sensor 12 includes an internal float 120 slideably received within an outer shell or housing 122 of sensor 12. Float 120 is designed for axial motion along the longitudinal axis of sensor 12, and is constrained from excessive radial translation by a centrally located guide rod 124 received in a correspondingly sized bore through float 120. FIG. 9 illustrates sensor 12 in a fully lowered position at the distal end of guide rod 124, in which a distal surface of float 120 abuts a float stop 126 affixed to a distal end of guide rod 124. Float stop 126 has a diameter larger than the bore through float 120 such that float 120 cannot advance distally beyond stop 126. In an exemplary embodiment, the fully-lowered position of float 120 defines the non-actuated configuration of sensor 12 as further described below.

Referring to FIG. 1, the distal end of sensor 12 may be placed in sump 18 such that the interior of housing 122 is in fluid communication with sump 18. As fluid accumulates in sump 18, fluid also flows into the cavity of housing 122, causing float 120 to advance upwardly along rod 124. This upward advancement occurs because float 120 has a density less than liquid fluids of interest in sump 18, including diesel fuel, gasoline and water. A switch, such as a magnetic hall effect sensor or any other suitable switch such as a reed switch, proximity sensor, sonar sensor or the like, detects the upward movement of float 120 and sends an indication, such as a signal, to controller 112 (FIG. 1). When such detection has occurred, sump liquid sensor 12 is considered to be the in the actuated configuration. For purposes of the present disclosure, the "actuated" physical configuration of sensor 12 is the state in which float 120 is toggled to a position corresponding to the presence of an unacceptable level of fluid within sump 18, it being understood that various configurations of the sensor, sump, and switch may be employed as required or desired for a particular application. For example, the switch may be normally-closed, such that the indication or "signal" sent to controller 112 may be the loss of an electrical connection across sensor 12, or may be normally open, such that the indication or "signal" sent to controller 112 is the creation of such an electrical connection.

In an exemplary embodiment, controller 112 is a microprocessor-based controller programmed to determine, based on the "actuated" indication or signal received from sensor 12, that liquid is present within sump 18. Corrective and/or remedial action may then be initiated by controller 112, such as activation of an alarm detectable by system operators, e.g., electronic notification including internet-based communications such as email, mobile texting, SMS messaging, or the like. Correction actions may also include activation of fuel shut-off systems to eliminate further flows of fuel through intake and discharge pipes 14, 16 (FIG. 1) by, e.g., shutting off power to a submersible or suction pump used for fuel withdrawals. In one particular application, controller 112 may be a computer also responsible for other system functions within the context of a fuel storage and distribution system. One such computer is a tank gauge computer which also monitors the level, quality and characteristics of fuel contained within underground storage tank 100. Various fuel storage and distribution systems useable in conjunction with tank access chamber assembly 10 are described in further detail below. Controller 112 may therefore be located in any suitable location, generally outside of tank access chamber 22 and remote from assembly 10. Exemplary locations for controller 112 include within a service station building near tank 100 or in a separate building or kiosk. Electrical cables between the remote location of controller 112 and assembly 10 may be run through underground electrical conduits 113 sealed to the wall of tank 20. Alternatively, controller 112 may be at least partially contained within tank access chamber 22.

In order to ensure proper function of sensor 12 over the service life of tank access chamber assembly 10, it may be desirable to actuate float 120 periodically for observation of the function of sensor 12 and controller 112, and verification of proper system function upon such actuation. In some applications, it may be desirable to perform such tests automatically, i.e., solely by issuance of a command from controller 112 and without operator input. For example, controller 112 may be programmed to effect a test of sensor 12 on a regular periodic time schedule, such as weekly, monthly or annually, such that a regular testing regime can be implemented without requiring consistent operator input. In addition to this automatic, controller-mediated testing regime, controller 112 may also be programmed with an override function which allows an operator to effect a test of sensor 12 independently of the programmed testing regime. In some applications, further testing functionality may be provided in the form of a manual control which allows the operator to manually operate float 120 without the use of controller 112. Descriptions of exemplary systems which facilitate such manual and automated testing of the function of sensor 12 follow, with reference to one or more of FIGS. 9-25.

In FIG. 9, sensor 12 is equipped with a generally vertical pull rod 128 disposed between the outer perimeter of float 120 and the adjacent inner perimeter of housing 122. Pull rod 128 extends downwardly from a proximal location, across the axial extent of float 120, and terminates at a distal end. At the distal end of pull rod 128, a radial protrusion 130 extends radially inwardly such that protrusion 130 is positioned underneath float 120 as illustrated. When rod 128 is urged in a proximal direction by force F1, radial protrusion 130 engages a distal surface of float 120 and pulls float 120 upwardly along guide rod 124 to physically lift float 120 into an actuated position, even if no substantial amount of fluid is present in sump 18.

As further discussed in detail below, force F1 for actuation of pull rod 128 may be provided by force generator controllable by controller 112. The motive force for the force generator, (e.g., the actuator or motor) can be electric, pneumatic or hydraulic, including hydraulic force generators powered by fuel under pressure or vacuum from a submersible pump, or dispenser pump used for fuel delivery via discharge pipe 16, or a pump-driven vacuum generator such as a submersible pump venturi. This motive force may be actuated by a solenoid or similar control/driver interface such that a signal from controller 112 can selectively activate the actuator or motor to drive pull rod 128 upwardly or downwardly. As noted above, a test controller, which may be integrated into controller 112 or may be a separate controller, may activate the force generator pursuant to programming (e.g., for regular periodic testing of sensor function) or pursuant to a manual command by a system operator, such as a push button. In addition, pull rod 128 may provide for manual actuation by an operator, e.g., by having a proximal end accessible from above grade G to allow the operator to manually grasp the proximal end and pull up float 120 by hand.

Figure 10:
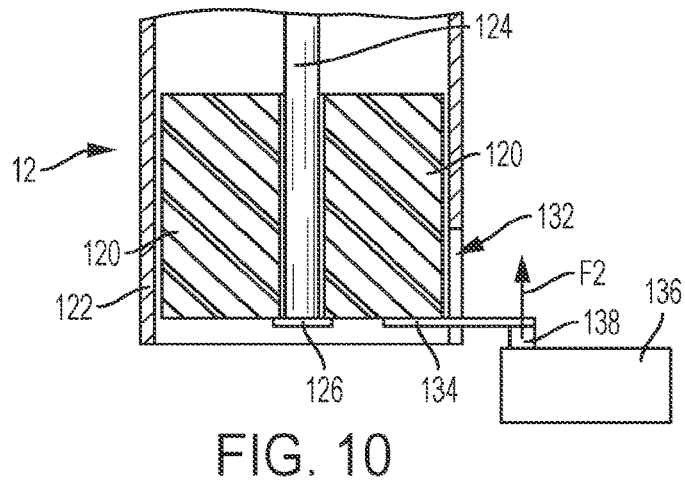
FIG. 10 is a cross section, elevation view of a distal end of a sump liquid sensor made in accordance with the present disclosure, including a second test actuation mechanism.

Turning now to FIG. 10, an alternative arrangement is illustrated in which radial actuator 134 passes through a slot 132 formed in the sidewall of housing 122 of sensor 12. As illustrated, radial actuator 134 is positioned to engage the distal surface of float 120 at one end and plunger 138 of a force generator, illustratively linear actuator 136, at the opposing end. Actuator 136 may be actuated, e.g., by controller 112, such that actuator 136 generates force F2 to extend plunger 138 outwardly. This pushes radial actuator 134 and float 120 upwardly. In this way, sensor 12 may be toggle from its non-actuated configuration to its actuated configuration by actuator 136, which may in turn be operably connected to controller 112 as described herein.

Figure 11:
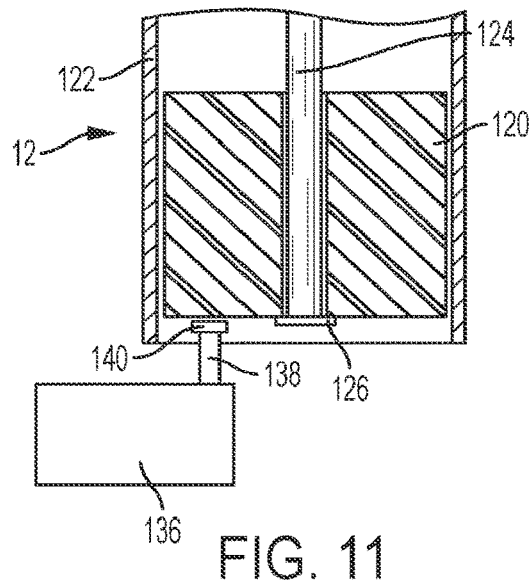
FIG. 11 is a cross section, elevation view of a distal end of a sump liquid sensor made in accordance with the present disclosure, including a third test actuation mechanism.

Turning now to FIG. 11, yet another remote actuation system is illustrated in which plunger 138 of actuator 136 is placed directly underneath float 120, such that actuation of actuator 136 (e.g., by controller 112) directly forces float 120 to advance upwardly as plunger 138 extends outwardly. In the illustrated embodiment, an intermediate contact plate 140 may be affixed to the end of plunger 138 in order to provide desired surface contact characteristics (e.g., surface pressure) between plunger 138 and float 120.

Figure 12:
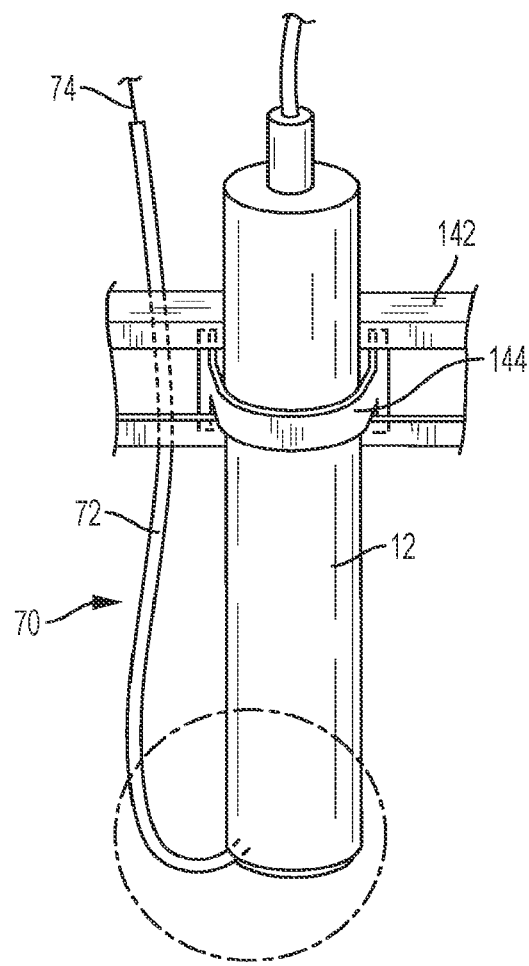
FIG. 12 is a perspective view of a sump liquid sensor made in accordance with the present disclosure, including a cable-operated sensor tester.

FIG. 12 illustrates an exemplary embodiment of a cable-operated sensor tester 70 utilizing a Bowden cable type actuator having a stationary cable sheath 72 surrounding a removable cable core 74. In the illustrated embodiment, sensor 12 is fixed to framework 142 via collar 144. Framework 142 may be connected to manway lid 30 (FIG. 1) in any suitable fashion, or, in the alternative, sensor 12 may be fixed to lid 30 via magnetic sensor retainer 40 as shown in FIG. 2 and described in detail above.

Figure 13:
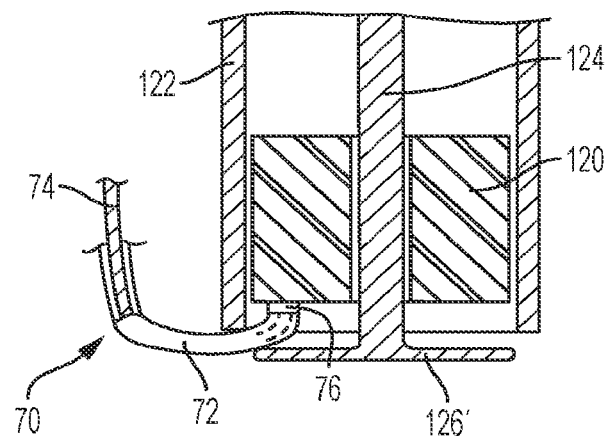
FIG. 13 is a cross section, elevation view of a distal portion of the sensor shown in FIG. 12, illustrating the sensor tester in a non-actuated configuration.
Figure 14:
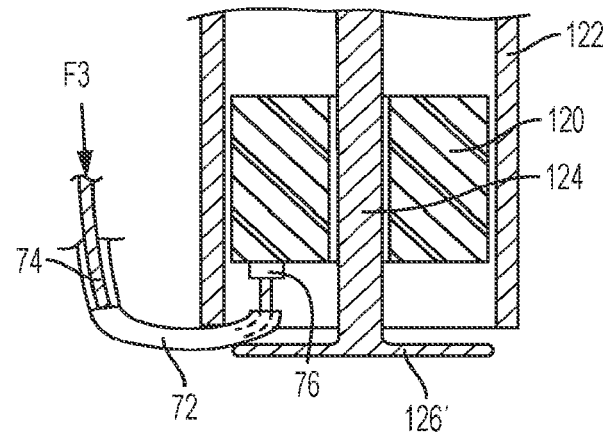
FIG. 14 is another cross section, elevation view of the sensor shown in FIG. 13, in which the sensor tester is in an actuated configuration.

Cable-operated sensor tester 70 terminates at an upwardly facing distal end shown in FIG. 13. Sheath 72 descends from a proximal end downwardly into sump 18 (FIG. 1), and its distal end turns to ascend upwardly into the cavity of sensor housing 122. In a non-actuated configuration, pressure plate 76 affixed to the distal end of cable core 74 is in a lowered position abutting cable sheath 72. When cable core 74 is axially advanced through sheath 72 by force F3 as shown in FIG. 14, pressure plate 76 advances upwardly, pushing float 120 away from its non-actuated position abutting (or adjacent to) float stop 126' in a proximal direction such that sensor 12 is actuated into its actuated/test position. Advantageously, the proximal end of cable-operated sensor tester 70 may be terminated at any desired location and position, such as above grade G or at a remote location within tank access chamber 22.

The proximal end of cable core 74 may be operably connected to a force generator such as a linear actuator or motor, which can be controlled by controller 112 to selectively generate force F3 upon command. Exemplary force generators may include a motorized winding drum having core 74 wound therearound, or a linear actuator plunger which acts directly upon the proximal terminal end of cable core 74. Such a motor or actuator may be pneumatic, electric or hydraulic, for example, as described in further detail herein. Alternatively or in addition to the electronically controllable force generator, a manual override actuator may be provided so an operator may manually push and/or pull on cable core 74 to actuate sensor 12.

Figure 15:
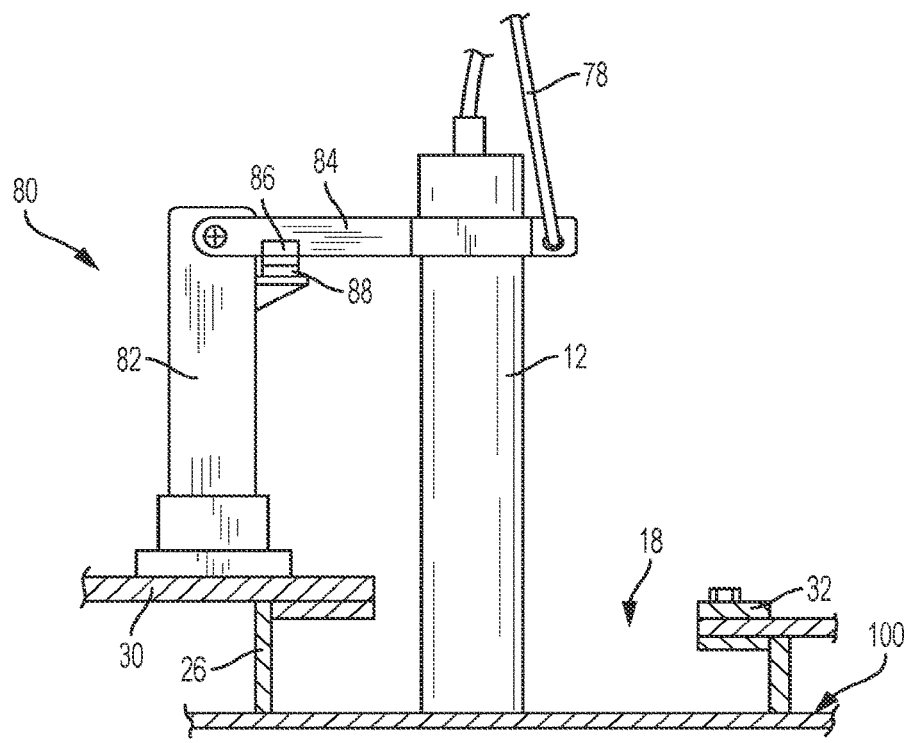
FIG. 15 is a cross section, elevation view of a swing arm-operated sensor tester made in accordance with the present disclosure, including a liquid sensor in a monitoring position within a sump.

FIG. 15 illustrates another testing arrangement amenable to manual and/or automated actuation. Swingarm-operated sensor tester 80 includes upright stanchion 82 fixed (e.g., by bolts, welding or a magnetic bracket, such as magnet sensor retainer 40 described herein) to manway lid 30 and extending upwardly therefrom. Swingarm 84 is rotatably attached to stanchion 82 and extends radially outwardly from manway lid 30 over sump 18 as shown. Sensor 12 is clamped or otherwise fixed upon swingarm 84, such that the distal end of sensor 12 extends downwardly into sump 18 in the monitoring configuration of tester 80 illustrated in FIG. 15. In an exemplary embodiment, a moveable magnet 86 is fixed to swingarm 84 and an opposite polarity fixed magnet 88 is fixed to stanchion 82. When swingarm 84 is in the monitoring configuration (e.g., substantially horizontal as shown), magnet 86 is magnetically engaged with magnet 88 to create an attraction force therebetween, thereby creating a force which urges swingarm 84 to remain stationary in the monitoring configuration shown in FIG. 15.

Figure 16:
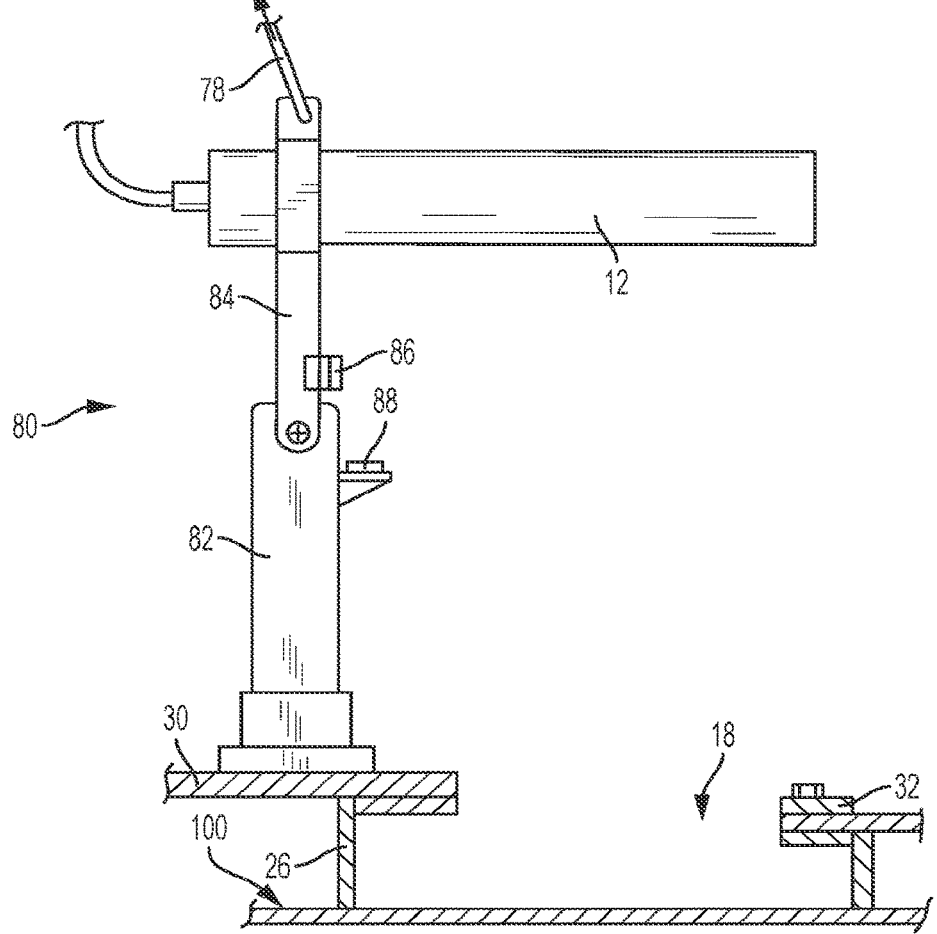
FIG. 16 is another cross section, elevation view of the swing arm-operated sensor tester shown in FIG. 15, in which the tester has been swiveled toward a sensor test position.

When it is desired to test the function of sensor 12, force F4 is applied to pull cord 78, which is affixed to the radially outward end of swingarm 84 as shown in FIGS. 15 and 16. Force F4 is sufficient to overcome the magnetic attraction force between magnets 86, 88, and lift swingarm 84 and sensor 12 upwardly as shown in FIG. 16. As sensor 12 reaches a horizontal position as shown in FIG. 16, the force of gravity tending to maintain float 120 (FIG. 9) and the distal position is eliminated. Further pivoting of sensor 12 via swingarm 84, such that the sensor is at least partially inverted (i.e., the distal end of sensor 12 is placed higher than its proximal end), causes gravity to urge float 120 proximally along guide rod 124 (see, e.g., FIG. 9), thereby actuating sensor 12 without the presence of liquid in sump 18. When the test is complete, force F4 may be reversed or eliminated, allowing swingarm 84 and sensor 12 to return from the test position to the monitoring position (FIG. 15).

Figure 17:
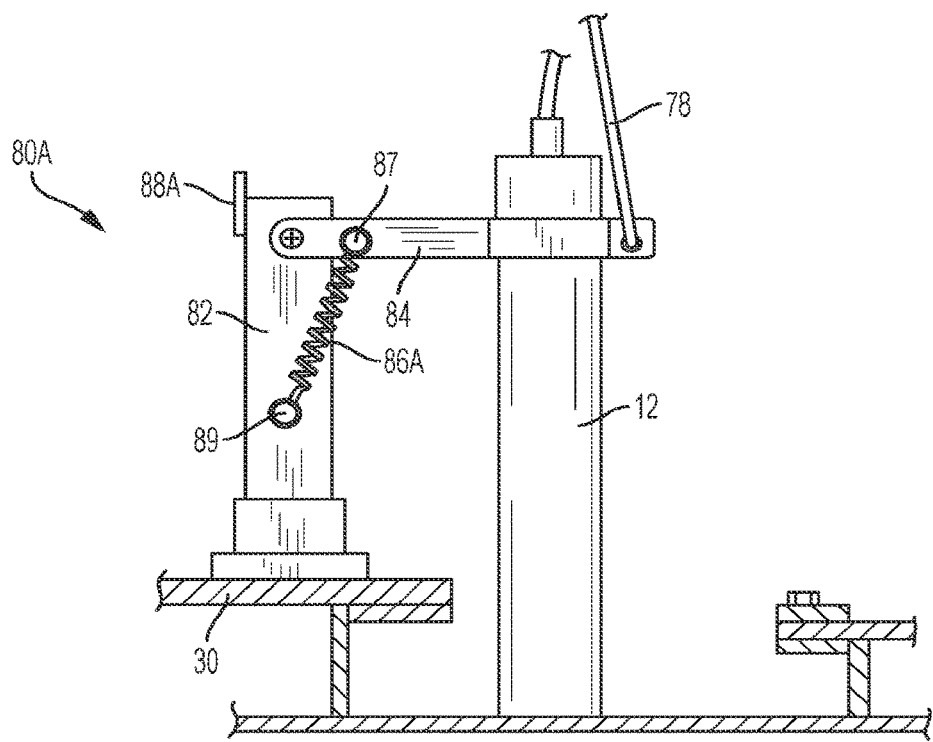
FIG. 17 is a cross section, elevation view of another swing arm-operated sensor tester, with a sump liquid sensor in a monitoring position within a sump.
Figure 18:
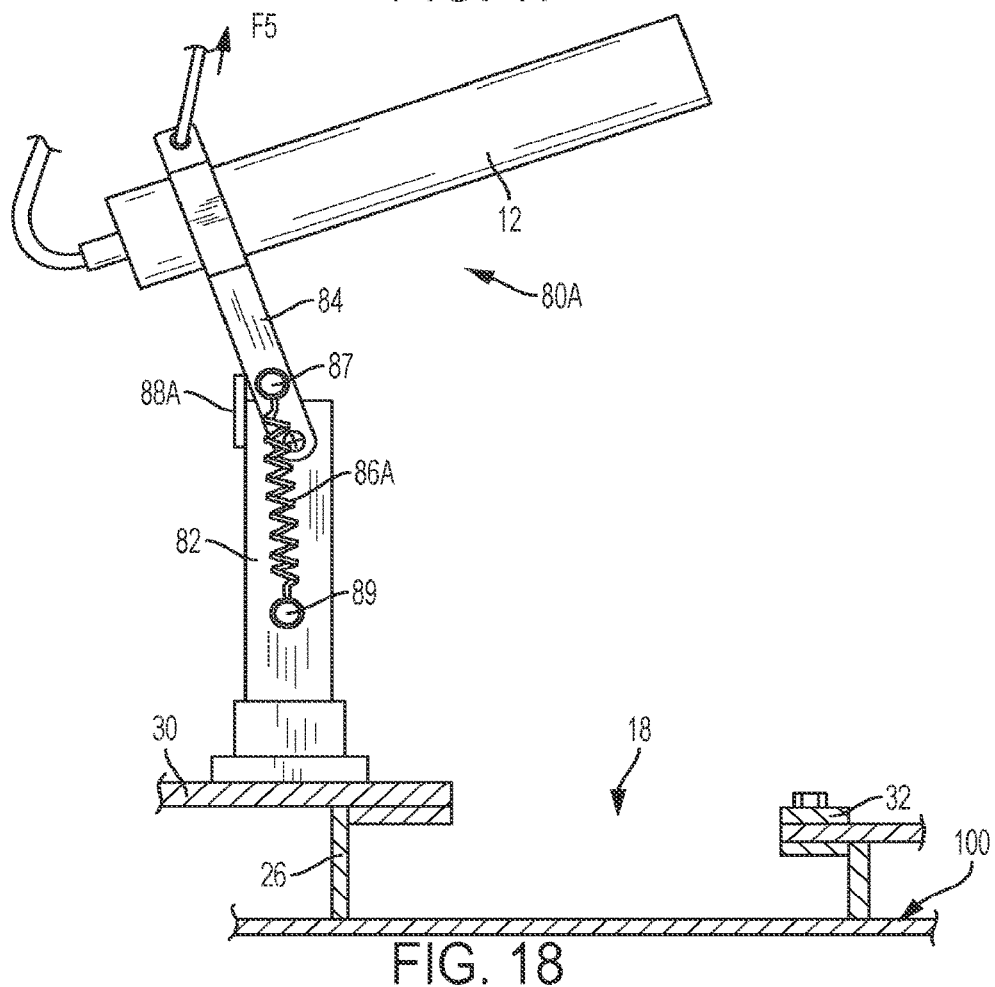
FIG. 18 is another cross section, elevation view of the swing arm-operated sensor tester shown in FIG. 17, with the sensor swiveled into a sensor test position.

FIGS. 17 and 18 show another swingarm-operated sensor tester 80A similar in structure and function to tester 80 described above. Corresponding reference numerals in tester 80A describe similar structures to tester 80, except with the letter "A" appended there to indicate a difference in structure or function from the corresponding structure of tester 80.

For example, swingarm 84 is retained in the monitoring configuration of FIG. 17 not by magnets, but rather by extension spring 86A which is rotatably fixed to both stanchion 82 and swingarm 84 as illustrated. As swingarm 84 is lifted by tension and pull cord 78 as described above, extension spring 86A is elongated and reaches a maximum elongation when pivot point 87 on swingarm 84 is directly above pivot point 89 on stanchion 82. Thereafter, as swingarm 84 continues to pivot into the test configuration of FIG. 18, spring 86A is allowed to slightly compress such that spring 86A urges swingarm 84 to remain in the test configuration until dislodged therefrom by a force F5. In the illustrated embodiment, the final test configuration is defined by swingarm stop 88A which contacts swingarm 84 at the desired configuration.

Advantageously, the swingarm-operated sensor testers 80, 80A operated by pull cord 78 are amendable to automated or manual actuation as required or desired. For example, pull cord 78 may have a proximal end above grade G (FIG. 1) which is easily accessible to service personnel for manual application of forces F4 and F5 in a testing procedure. In such a manually-actuatable embodiment, pull cord 78 may be stowed beneath grade lid 106 and/or subgrade lid 104 for protection during normal service, and retrieved by removal of lids 106 and/or 104 for actuation.

Alternatively or in addition to the manually-operable pull cord 78, the same or a different cord 78 may be coupled to an actuator operably connected to controller 112 (FIG. 1), such as a motorized winding drum, or linear actuator powered by a pneumatic, hydraulic or electrical power source as described above with respect to cable-operated tester 70. Such an actuator may be placed, for example, within tank access chamber 22 at a suitable location above swingarm-operated sensor tester 80, 80A to impart a desired direction and magnitude for forces F4 and F5. To the extent that the directionality of forces F4 and F5 may vary depending on the particular location and configuration of swingarm 84 and the potential for variable force directions in connection with the test-position and monitoring-position biasing forces provided by spring 86A, two actuators may be used each with a separate pull cord 78. Alternatively, the relative vertical position of pull cord 78 above tester 80A may be moved by translating the actuator between two positions within tank access chamber 22 or translating an idler pulley between two such positions, for example.

Turning now to FIG. 19, cam-operated sensor tester 90 is illustrated as another option for automatically reconfiguring sensor 12 between a monitoring position and a test position. Tester 90 includes upright stanchion 92 with sensor housing 94 pivotably connected thereto about longitudinal axis A. As described in further detail below, sensor 12 extends through an aperture formed in sensor housing 94 with the longitudinal axis of sensor 12 substantially perpendicular to rotational axis A, such that rotation of housing 94 rotates sensor 12 from its monitoring position (shown in FIG. 19) to a test position (shown in, e.g. FIG. 23). In the partially inverted test position, float 120 (FIG. 9) is allowed to translate under the force of gravity to its actuated position, similar to the operation of the test positions described above with respect to swingarm-operated sensor testers 80, 80A.

Cam shaft 96, shown in FIGS. 19 and 20, passes through upright stanchion 92 (FIG. 19) and into a central bore formed through housing 94 (FIG. 20) generally perpendicular to the housing bore which receives sensor 12. Housing 94 is rotatably supported upon cam shaft 96, via retainer ring 95. Housing 94 also rotates with respect to stanchion 92, with a low friction bearing 97 optionally provided there between in order to facilitate rotation. In an exemplary embodiment, cam shaft 96 is rotated by motor 98, which is fixed to stanchion 92 as illustrated. As with other embodiments described herein, motor 98 may be electrically powered, pneumatically powered, or hydraulically powered, for example. As described further below, motor 98 may be a stepper or servo-type motor suitable for precise rotational positioning of cam shaft 96 with less than one full rotation of the motor mandrel in normal operation.

For electric motors used in sensor testers contained within tank access chamber 22 as described herein, the motors may be a sealed bearing type bearing an ATEX or IECEx designation signifying approval for use in a potentially explosive atmosphere. Thus, such electric motors may be used in areas where fuel or fuel vapor may be present, such as tank access chamber assembly 10 used in conjunction with an underground fuel storage tank 100 as shown in FIG. 1.

FIG. 19 illustrates stanchion 92 supported on lid 30 by magnetic sensor retainer 40, as shown in FIGS. 1-5 and described in detail above. For simplicity, only stanchion 92 is shown to be supported magnetic sensor retainer 40 but it is contemplated that any of the sensor testers described herein may be supported by magnetic sensor retainer 40 as required or desired for a particular application. Moreover, combining sensor retainer 40 with an automatically testable sensor tester such as testers 70, 80, 80A, 90 or 90A provides complementary benefits in the context of tank access chamber assembly 10 (FIG. 1) and the underground fuel storage system of which it forms a part. For simplicity, the interaction between such testers and magnetic sensor retainer 40 will be described with respect to tester 90 alone, it being understood that such interaction is equally applicable to any sensor tester design within the scope of the present disclosure.

Upon activation of sensor tester 90, sensor 12 may fail to actuate, i.e., sensor 12 may fail the test for which tester 90 is designed. If such a failure occurs, controller 112 may alert an operator as noted herein, and the next step in the protocol may then be to retrieve the sensor for manual inspection and potential repair or replacement. Similarly, it may be determined for other reasons that sensor 12 requires manual (i.e. physical) inspection by an operator directly, such as a time delay after actuation of tester 90 and before actuation of sensor 12. As described in detail above, magnet sensor retainer 40 and extraction tool 50 facilitate such a retrieval process, as well as eventual re-installation of a new or repaired sensor 12 within tank access chamber 22.

Turning to FIG. 20, cam shaft 96 is shown received within the central bore of housing 94 with clearance, such that cam lobe 190 and cam key 192 may rotate freely therein. In addition, the central bore through housing 94 includes notch 194 which interacts with key 192 to rotate sensor 12 from the monitoring position to the test position as further described below.

Sensor 12 is biased into the illustrated monitoring position by torsion spring 196, illustratively positioned within the bore of housing 94 and coiled around cam shaft 96. Torsion spring 196 is arranged to urge rotation of housing 94 relative to cam shaft 96 until movable stop 198 coupled to housing 94, contacts fixed stop 199 coupled to stanchion 92. In this way, torsion spring 196 cooperates with stops 198, 199 to define the generally upright and vertical configuration of sump liquid sensor 12 associated with the monitoring configuration of cam-operated sensor tester 90.

Figure 22:
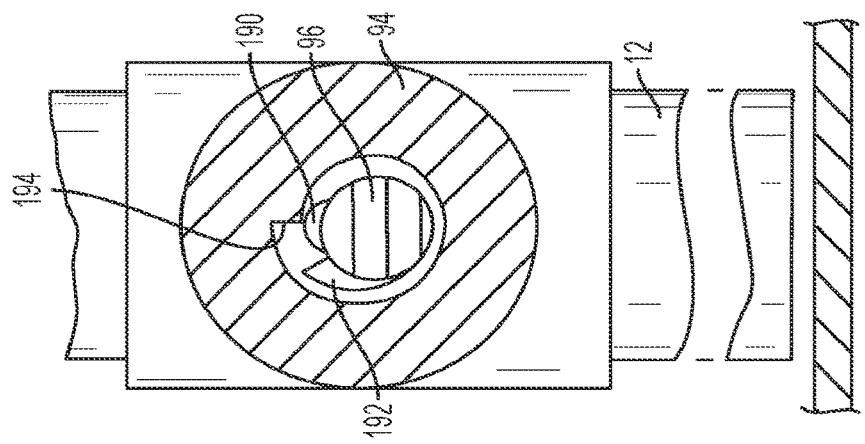
FIG. 22 is another cross section, elevation view of the cam shaft and sensor housing shown in FIG. 21, in which a cam lobe of the cam shaft has lifted the sensor from its monitoring position.
Figure 21:
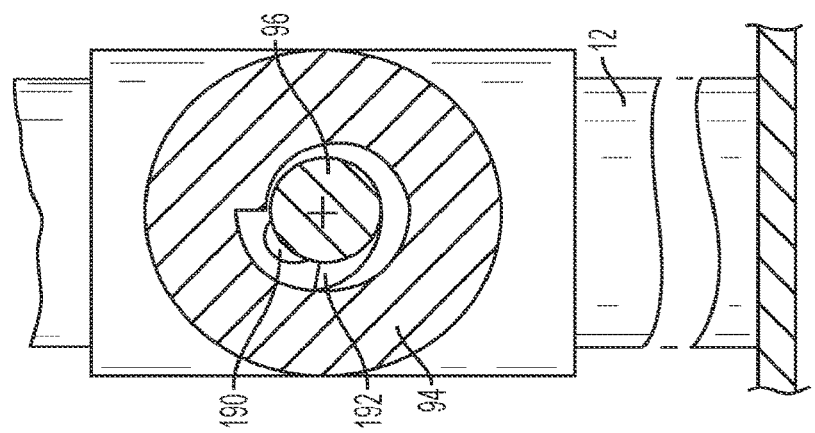
FIG. 21 is a cross section, elevation view of the cam shaft and sensor housing of the cam-operated sensor tester shown in FIG. 19, taken along the line of XXI-XXI of FIG. 19, with the sensor in a monitoring configuration.

When it is desired to rotate sensor 12 away from the monitoring position and into the test position, motor 98 may be actuated to rotate cam shaft 96 relative to housing 94. As shown in FIG. 21, cam shaft 96 starts from a rotational position in which neither cam lobe 190 nor key 192 engages the inner bore of housing 94 with any significant force. In this configuration, sensor 12 is in its fully deployed position at the bottom of sump 18 (FIG. 19) and is in a generally upright and vertical configuration. As motor 98 rotates cam shaft 96 in a clockwise direction from the perspective of FIG. 21, an intermediate configuration is achieved as shown in FIG. 22. In this configuration, cam lobe 190 engages the wall of the central bore of housing 94 such that housing 94 is lifted upwardly. Key 192 is not yet in any significant force transferring relationship with housing 94. The upward lift of housing 94 provided by cam lobe 190 elevates the distal end of sensor 12 within sump 18, as illustrated in FIG. 22, such that sensor 12 is ready to be rotated away from its monitoring position without risking any damage to the distal end of sensor 12.

Next, as cam shaft 96 continues to rotate in a clockwise direction from the perspective of FIG. 22, key 192 advances toward and eventually engages the correspondingly formed notch 194 within the bore of housing 94. Further rotation of cam shaft 96 rotates housing 94 and sensor 12 about longitudinal axis A (FIG. 19) and lifts the distal end of sensor 12 out of sump 18. As rotation continues to the partially inverted configuration of FIG. 23, the distal end of sensor 12 is rotated to be above the proximal end of sensor 12, such that float 120 may axially advance toward the actuated position within sensor 12 under the force of gravity as described in detail above. When so advanced, actuation of sensor 12 occurs without the presence of an unacceptable amount of fluid in sump 18 and the testing procedure is complete.

Figure 23:
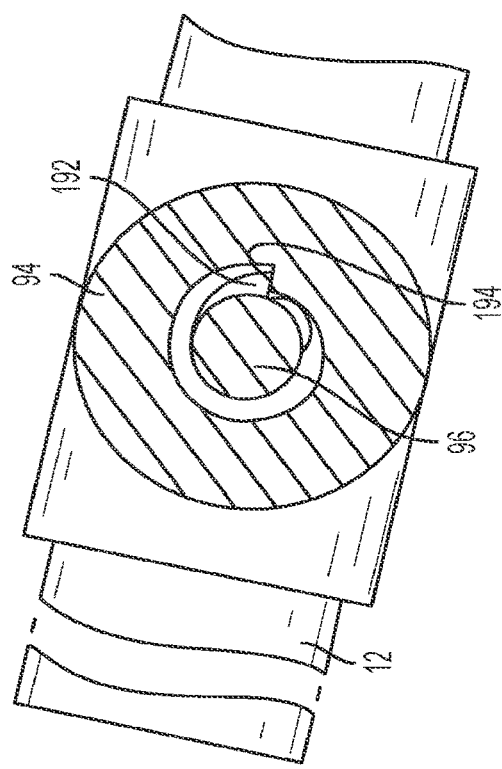
FIG. 23 is another cross section, elevation view of the cam shaft and sensor housing shown in FIG. 21, in which the sensor has been rotated into the sensor test position via interaction between a cam shaft key and corresponding sensor housing notch.

To move the sensor 12 from the test configuration of FIG. 23 back to the monitoring configuration of FIG. 21, rotation of cam shaft 96 is simply reversed to the counter-clockwise direction, allowing sensor 12 and housing 94 to rotate under the force of torsion spring 196 (FIG. 19) back to the substantially upright and vertical position of FIGS. 19 and 21.

Turning now to FIGS. 24 and 25, a second rotatable sensor tester 90A is shown. Tester 90A is similar in overall structure and function to tester 90 described above, in that a central shaft 96A pivotably attaches sensor 12 to upright stanchion 92A via sensor housing 94A. Tester 90A utilizes similar design features and operational principles as tester 90 described above, and corresponding structures and features of tester 90A have corresponding reference numerals to magnetic tester 90, except with "A" added thereto.

However, shaft 96A does not utilize cam-on-lobe or key-on-notch arrangements as described above with respect to sensor tester 90, but rather, shaft 96A is simply rotatably connected to housing 94A. Also, in the illustrated embodiment, cable 98A is used to rotate housing 94A relative to stanchion 92A, rather than motor 98 as described above. It is contemplated that motor 98 can be used in conjunction with tester 90A, and that cable 98A can be used with tester 90, consistent with transferability of drive mechanisms among the various tester designs as described herein.

Generally speaking, torsion spring 196A biases sensor 12 and housing 94A into the generally upright and vertical monitoring configuration shown in FIG. 24. When cable 98A is pulled with force F6, the wrap of cable 98A around the generally cylindrical outer surface of housing 94A causes housing 94A to rotate against the biasing force of spring 196A to lift and rotate sensor 12 away from the monitoring position toward a test position. Referring to FIG. 25, it can be seen that the axis of rotation Al of housing 94A is laterally offset with respect to the longitudinal axis of the generally cylindrical sensor 12. Thus, when force F6 is applied to cable 98A, sensor 12 is not only rotated away from its vertical configuration but also lifted at the distal end thereof away from the bottom of sump 18 (FIG. 24). This offset configuration protects the distal end of sensor 12 during the reconfiguration of the system between the monitoring and testing configurations.

Turning now to FIGS. 26-28, a control modality for remote monitoring and testing of the function of sensor 12 is illustrated. For simplicity, the control system is shown and described with reference to liquid reservoir 300 and associated structures, it being understood that such structures may correspond to the analogous structures of assembly 10 described in detail above. For example, liquid sensor 12 may be identical to, or compatible or interchangeable with, liquid sensor 310. Similar relationships may exist for tank 20 and reservoir 300, controller 112 and controller 320, float 120 and floating element 316, the various testers described above and testing device 340, and tank access chamber and liquid chamber 306. Similarly, distal actuator 342 may be identical to, or interchangeable or compatible with, the distal portions (i.e., portions contained within chamber 22) of the various testers described herein, while proximal control 344 may be identical to, or interchangeable or compatible with, the proximal portions (i.e., portions outside of chamber 22) of the various testers described herein.

FIGS. 26-28 illustrate operation of a liquid sensor 310 coupled to a testing device 340 and operable in a liquid reservoir 300 to detect a liquid 308. FIG. 26 depicts liquid 308 at a threshold level, i.e., in sufficient quantity to cause a level indicator 322 to emit a liquid presence indication 324. FIG. 27 depicts liquid 308 below a threshold level, i.e., in a quantity insufficient to cause level indicator 322 to emit liquid presence indication 324 (which, accordingly, has been omitted from FIG. 27). In both instances testing device 340 is configured in a service configuration. FIG. 28 depicts liquid 308 below the threshold level, in a quantity insufficient to cause level indicator 322 to emit liquid presence indication 324, but with testing device 340 configured in a testing configuration, such that level indicator 322 is shown emitting liquid presence indication 324. This is the same basic functional modality which allows testers in accordance with the present disclosure, including testers 70, 80, 80A, 90 or 90A, to selectively actuate sensor 12 even when no liquid is present at or above a threshold level within sump 18. The abovementioned structure and related functionalities are described in more detail below.

Liquid reservoir 300 comprises an access chamber 302 and a liquid chamber 306 adjacent thereto which may contain liquid 308. A level threshold detectable by liquid sensor 310 is indicated by a level line 318. Liquid sensor 310 comprises detection logic 312 and a detection transducer 314 comprising a floating element 316. Detection logic 312 is configured to detect and output a level indication when floating element 316 reaches the level threshold. A controller 320 receives the level indication and outputs a level signal to a level indicator 322. Upon receipt of the level signal, level indicator 322 emits liquid presence indication 324. In variations of the present embodiment detection logic 312 forms part of controller 320. In variations of the present embodiment detection logic 312 and level indicator 322 form part of controller 320. In variations of the present embodiment controller 320, and any variations thereof, is positioned outside access chamber 302. As shown, detection logic 312 is positioned within liquid chamber 306.

Testing device 340 comprises a distal actuator 342 and a proximal control 344. Distal actuator 342 is positioned, at least in part, within liquid chamber 306. Proximal control 344 is positioned outside liquid chamber 306 and, preferably, outside access chamber 302, such that a user may actuate proximal control 344 without entering or access chamber 302 to actuate testing device 340. As shown, distal actuator 342 comprises a distal end of a control wire coupled to floating element 316 and proximal control 344 comprises a proximal end of the control wire. A user may thus pull on the control wire (or may program or direct a controller, such as controller 112, to actuate a force generator to pull on the control wire) to lift floating element 316 and cause level indicator 322 to emit liquid presence indication 324, as shown in FIG. 28. Testing device 340 may comprise any of the actuation mechanisms described above and liquid sensor 310 may comprise any of the liquid sensors described above, such as liquid sensor 12.

Detection logic may be comprised by liquid sensor 310 or incorporated in controller 320. The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. A non-transitory machine-readable medium comprising logic can additionally be considered to be embodied within any tangible form of a computer-readable carrier, such as solid-state memory, magnetic disk, and optical disk containing an appropriate set of computer instructions and data structures that would cause a processor to carry out the techniques described herein. A non-transitory machine-readable medium, or memory, may include random access memory (RAM), read-only memory (ROM), erasable programmable read-only memory (e.g., EPROM, EEPROM, or Flash memory), or any other tangible medium capable of storing information.

5. Other System Components

Various other system components and subsystems may be integrated with access chamber assembly 10 for complementary functions. Exemplary systems combinable with access chamber assembly 10 in the context of a comprehensive, redundant and safe underground fuel storage system are further described below.

A remote viewing system may be used to monitor remote installation, removal and/or actuation of sensor 12, each of which is described in detail above. The viewing system may include, for example, a video camera which monitors the interior of tank access chamber 22 and is viewable from a remote location, e.g., a control room. Via the video feed provided by the video camera, a station operator can view remote actuation of sensor 12 and visually verify proper placement into the test and/or monitoring configurations as described in detail above. Further details of an exemplary remote viewing and verification system can be found in International Patent Application Publication No. WO 2016/025456, entitled MONITORING SYSTEM FOR A REFUELING STATION and filed Aug. 11, 2015, the entire disclosure of which is hereby expressly incorporated herein by reference.

Tank 20 may be formed from leak-resistant polyethylene, such as by forming two tank halves and joining the halves together by electrofusion welding to form tank 20 with tank access chamber 22. In this embodiment, the two halves form one homogeneous part after welding. Alternatively as shown in FIG. 1, tank access chamber 22 may be formed from a base panel 36 which is attached to a tank collar or sidewall 38 rising from base panel 36. Base panel 36 and sidewall 38 may be fused in a watertight manner, such as by electrofusion. The polyethylene tank 20 which defines the tank access chamber 22 is configured to allow access from above ground to a tank manway, within the watertight tank access chamber 22 defined by the tank 20. The tank forming the tank access chamber can be sealed, e.g., to manway riser 26 and/or to a tank collar 24 of underground storage tank 100 such that a leak from the manway is contained in the tank access chamber 22. Any liquid from such a leak will accumulate in sump 18 and be detected by sensor 12 as described in detail above.

Electrofusion entry seals may also be employed to allow pipes and cable ducts, including fuel intake pipe 14 and fuel discharge pipe 16 shown in FIG. 1, to penetrate the wall of the tank 20 and enter into the tank access chamber 22. Such entry seals may weld to both the ducts and/or pipes (e.g., pipes 14, 16) and the material of tank 20 such that the pipes and electrical ducts become one homogeneous part together with the polyethylene tank 20, while also being sealed against ingress of ground water. Exemplary entry seals suitable for use in conjunction with systems of the present are described in International Patent Application Number PCT/US2015/042450, co-owned with the present application, which was filed Jul. 18, 2015 and is entitled ELECTRIC TRANSITION CHAMBER, the entire disclosure of which is hereby expressly incorporated herein by reference. Vapor seals for sealing cable ducts to cables in an airtight manner may also be employed to stop the transfer of vapors into or out of the tank chamber 22.

An overfill prevention valve (OPV) may be fitted into a filling pipe extending into the underground polyethylene tank 20, such as fuel intake pipe 14. The OPV provides a valve actuation (e.g., a mechanical valve actuation) when the tank is filled past a certain level, reducing the flow into the tank to a low level to allow draining of the tanker fill line which feeds intake pipe 14. Exemplary OPVs suitable for use with the system of the present disclosure are described in U.S. Patent Application Publication No. 2014/0076421, filed Sep. 13, 2013 and entitled OVERFILL PREVENTION VALVE, and U.S. Patent Application Publication No. 2015/0240966, filed Aug. 27, 2015 entitled DROP TUBE SEGMENT, the entire disclosures of which are hereby expressly incorporated herein by reference. Such an OPV system may further include a removable filling line riser cap positioned above the OPV which can be removed and re-fit using an extended tool, such as extraction tool 50 described in detail above. In particular, hook 56 and/or foot 58 of extraction tool 50 may be engaged with an exemplary filling line riser cap and used to manipulate the cap without the need for the operator to physically enter the tank access chamber 22.

In another embodiment, operation of such an OPV may be manually effected by use of a tool with extended handle and a magnetic lifting head, which can be inserted into the filling line from above without the need for the operator to physically enter the tank access chamber 22. In this way, operation of the OPV can be validated. Examples of an OPV with remote testing for use with the present disclosure can be found in U.S. Patent Application Publication No. 2015/0192220, filed Jan. 2, 2015 and entitled OVERFILL PREVENTION VALVE WITH REMOTE TESTING, the entire disclosure of which is hereby expressly incorporated herein by reference.

As noted above, secondary containment control module 110 and manifold 111 may be used in connection with a monitoring system, which in turn is fluidly connected to one or more evacuated interstitial spaces in double-wall containment structures, such as underground storage tank 100, pipes 14, 16, and spill containment units (not shown). Exemplary secondary containment systems are disclosed in U.S. Pat. No. 8,069,705, filed Jul. 20, 2009 and entitled "Method and apparatus for continuously monitoring interstitial regions in gasoline storage facilities and pipelines," and in U.S. Pat. No. 8,684,024, filed Oct. 14, 2010 and entitled "Spill Containment System," the entire disclosures of which are hereby expressly incorporated herein by reference.

While the present disclosure has been described as having exemplary designs, the present disclosure can be further modified within the spirit and scope of this disclosure. This application is therefore intended to cover any variations, uses or adaptations of the disclosure using its general principles. Further, this application is intended to cover such departures from the present disclosure as come within known or customary practice in the art to which this disclosure pertains.

What is claimed is:

1. A method of assessing a function of a sensor located in a tank defining a tank chamber, the sump formed at the bottom of the tank chamber, the method comprising:
   installing a sensor in a sump of a fuel dispensing system, such that the sensor extends downwardly into the sump to monitor for fluid infiltration of into the sump;
   after installing, assessing the function of the sensor without physically accessing the sump;
   determining that the sensor requires manual inspection by an operator based on assessing the function of the sensor;
   accessing the sump from above grade; and
   retrieving the sensor without physically entering the tank chamber.

2. The method of claim 1, wherein said assessing comprises actuating a float within the sensor without the presence of liquid in the sump.

3. The method of claim 2, wherein said actuating the float comprises manually actuating the float by toggling a proximal control from above grade.

4. The method of claim 2, wherein said actuating the float comprises automatically actuating the float by toggling a proximal control from above grade.

5. The method of claim 4, wherein said toggling comprises issuing a command from an electronic controller.

6. The method of claim 2, wherein said actuating the float comprises at least partially inverting the sensor such that the float moves proximally under the force of gravity.

7. The method of claim 2, wherein said actuating the float comprises raising the float via engagement of a lifting mechanism with the float.

8. The method of claim 1, wherein said determining comprises determining that the sensor has failed to actuate.

9. The method of claim 1, wherein said determining comprises:
- lowering an extraction tool having a retainer engagement device at a distal end thereof into the tank chamber from grade level;
- engaging the retainer engagement device with a magnetic sensor retainer fixed to the sensor;
- dislodging the magnetic sensor retainer from the tank chamber by using the extraction tool to disengage the magnetic engagement between the magnetic sensor retainer and an adjacent ferromagnetic surface; and
- using the extraction tool to raise the magnetic sensor retainer and the sensor out of the tank chamber.

10. The method of claim 9, wherein said dislodging comprises rotating the extraction tool to provide a lifting force on a stanchion of the magnetic sensor retainer, and to provide a counterbalancing downward force on an upper surface of the magnetic sensor retainer, which cooperates to form a mechanical advantage sufficient disengage the magnetic engagement between the magnetic sensor retainer and the adjacent ferromagnetic surface.

11. A method of assessing a function of a sensor retained within in a tank defining a tank chamber of a fuel dispensing system by a sensor retainer, such that the sensor extends downwardly into a sump formed at the bottom of the tank chamber to monitor for fluid infiltration into the sump, the method comprising:
- accessing the sump from above grade;
- lowering an extraction tool into engagement into the tank chamber from grade level until a distal end of the extraction tool engages the sensor retainer;
- connecting the extraction tool to the sensor retainer; and
- retrieving the sensor without physically entering the tank chamber by raising the extraction tool, the sensor retainer and the sensor.

12. The method of claim 11, further comprising installing the sensor back to its location in the tank chamber of the tank without physically accessing the tank chamber.

13. The method of claim 11, further comprising:
- assessing the function of the sensor without physically accessing the sump; and
- determining that the sensor requires manual inspection by an above-grade operator based on assessing the function of the sensor.

14. The method of claim 13, wherein said step of determining comprises determining that the sensor has failed to actuate.

15. The method of claim 11, wherein the sensor retainer is a magnetic sensor retainer fixed to the sensor, and wherein:
- said step of connecting comprises engaging the extraction tool with the magnetic sensor retainer;
- said step of retrieving the sensor comprises dislodging the magnetic sensor retainer from the tank chamber by using the extraction tool to disengage the magnetic engagement between the magnetic sensor retainer and an adjacent ferromagnetic surface, and then using the extraction tool to raise the magnetic sensor retainer and the sensor out of the tank chamber.

\* \* \* \* \*